(12) United States Patent
Nakamura et al.

(10) Patent No.: US 10,477,643 B2
(45) Date of Patent: Nov. 12, 2019

(54) LIGHTING DEVICE AND VEHICLE

(71) Applicant: Panasonic Intellectual Property Management Co., Ltd., Osaka (JP)

(72) Inventors: Toshiaki Nakamura, Osaka (JP); Kazuya Kato, Osaka (JP); Kenichi Fukuda, Osaka (JP); Akihiro Kishimoto, Osaka (JP)

(73) Assignee: Panasonic Intellectual Property Management Co., Ltd.

( * ) Notice: Subject to any disclaimer, the term of this patent is extended or adjusted under 35 U.S.C. 154(b) by 294 days.

(21) Appl. No.: 15/675,250

(22) Filed: Aug. 11, 2017

(65) Prior Publication Data

US 2018/0063918 A1 Mar. 1, 2018

(30) Foreign Application Priority Data

Aug. 30, 2016 (JP) ................. 2016-168428

(51) Int. Cl.
| | |
|---|---|
| *H05B 37/02* | (2006.01) |
| *F21S 43/00* | (2018.01) |
| *B60Q 1/00* | (2006.01) |
| *H05B 39/02* | (2006.01) |
| *H05B 33/08* | (2006.01) |

(52) U.S. Cl.
CPC .......... *H05B 37/02* (2013.01); *B60Q 1/0094* (2013.01); *F21S 43/00* (2018.01); *H05B 33/083* (2013.01); *H05B 39/02* (2013.01)

(58) Field of Classification Search
CPC ....... H05B 37/02; H05B 33/083; F21S 43/00; B60Q 1/0094

USPC ........................................... 361/58
See application file for complete search history.

(56) References Cited

U.S. PATENT DOCUMENTS

| | | | | |
|---|---|---|---|---|
| 9,497,822 B2* | 11/2016 | Miyoshi | ............... | H05B 33/089 |
| 9,615,424 B2* | 4/2017 | Ido | ...................... | H05B 33/0815 |
| 9,788,375 B2* | 10/2017 | Hasegawa | .......... | H05B 33/0815 |
| 2007/0229450 A1* | 10/2007 | Suzuki | ................. | G09G 3/3413 |
| | | | | 345/102 |
| 2007/0257623 A1* | 11/2007 | Johnson | ............. | H05B 33/0818 |
| | | | | 315/193 |
| 2010/0134018 A1* | 6/2010 | Tziony | ............... | H05B 33/0815 |
| | | | | 315/122 |
| 2011/0248640 A1* | 10/2011 | Welten | ............... | H05B 33/0815 |
| | | | | 315/210 |
| 2011/0285317 A1* | 11/2011 | Grebner | ............ | H05B 33/0815 |
| | | | | 315/297 |
| 2012/0081009 A1* | 4/2012 | Shteynberg | .......... | H05B 33/083 |
| | | | | 315/122 |

(Continued)

FOREIGN PATENT DOCUMENTS

JP 2011-192865 A 9/2011

*Primary Examiner* — Dharti H Patel
(74) *Attorney, Agent, or Firm* — Renner, Otto, Boisselle & Sklar, LLP

(57) ABSTRACT

An impedance adjustment circuit varies an impedance of a transistor, thereby adjusting an impedance of a current path. A second control circuit controls a drive circuit to turn on or off at least one switch device of the switch devices while the impedance adjustment circuit is increasing the impedance of the current path. The impedance adjustment circuit adjusts the impedance of the current path to the minimum value after the drive circuit switches the at least one switch device from off to on or from on to off.

20 Claims, 10 Drawing Sheets

(56) References Cited

U.S. PATENT DOCUMENTS

| | | | |
|---|---|---|---|
| 2012/0139428 A1* | 6/2012 | Grebner | H05B 33/0809 315/185 R |
| 2012/0139602 A1* | 6/2012 | Sakata | G06F 17/5031 327/262 |
| 2012/0187845 A1* | 7/2012 | Saes | H05B 33/0818 315/113 |
| 2012/0223649 A1* | 9/2012 | Saes | H05B 33/0818 315/186 |
| 2016/0044754 A1* | 2/2016 | Xu | H05B 33/0815 315/186 |
| 2016/0121783 A1* | 5/2016 | Takagimoto | B60Q 11/005 315/82 |
| 2016/0135261 A1* | 5/2016 | Chen | H05B 33/0824 315/191 |
| 2016/0353531 A1* | 12/2016 | Conner | H04N 5/2354 |

* cited by examiner

LIGHTING DEVICE AND VEHICLE

CROSS REFERENCE TO RELATED APPLICATION

This application claims the benefit and priority of Japanese Patent Application No. 2016-168428, filed on Aug. 30, 2016, the entire contents of which is incorporated herein by reference.

TECHNICAL FIELD

The disclosure relates to lighting devices and vehicles and, more particularly, to a lighting device configured to selectively turn light sources on and a vehicle equipped with the lighting device.

BACKGROUND ART

A lighting control device described in Document 1 (JP 2011-192865 A) exemplifies a related lighting device. The lighting control device described in Document 1 (hereinafter referred to as associated technology) includes a switching regulator configured to supply a driving current to a series circuit of LEDs (Light Emitting Diodes), and switch devices individually and electrically connected in parallel with the LEDs. The switching regulator has smoothing capacitors individually and electrically connected in parallel with the switch devices. The switch devices are configured to turn on and off according to respective driving pulses that are output from a gate driving control circuit to the switch devices. That is, each LED is lit when a switch device electrically connected in parallel therewith is off, and is unlit when it is on. When the switch device is switched from off to on, a charge stored in a capacitor electrically connected in parallel with the switch device is discharged via the switch device that is on. It is therefore possible to suppress the occurrence of an over-current through the LED because the charge stored in the capacitor is not discharged via other LEDs that are not electrically connected in parallel with the capacitor.

Incidentally, the associated technology has a problem causing an increase in size of a circuit board thereof because it requires the smoothing capacitors, a number of which is the same as that of the LEDs. In addition, the switch devices requires semiconductor switching devices having a high withstand current because a charge stored in each capacitor is discharged via a corresponding switch device.

SUMMARY

It is an object of the present disclosure to provide a lighting device and a vehicle, capable of decreasing withstand current requisite for a switch device and suppressing an over-current through a light source.

A lighting device according to an aspect of the present disclosure includes a power supply circuit, switch devices, a drive circuit, an impedance adjustment circuit and a control circuit. The power supply circuit has a first output terminal and a second output terminal and is configured to output a load current as a DC current from the first output terminal to the second output terminal. The switch devices are electrically connected in series between the first and second output terminals. Each of the switch devices is electrically connected in parallel with one or more light sources to be lit by the load current flowing therethrough. The drive circuit is configured to individually turn on and off the switch devices. The impedance adjustment circuit has an impedance device between the first and second output terminals and an impedance device driving circuit configured to vary an impedance of the impedance device in a prescribed range(between minimum and maximum values). The impedance adjustment circuit is configured to vary the impedance of the impedance device, thereby adjusting an impedance of a current path from the first output terminal to the second output terminal. The control circuit is configured to control the drive circuit and the impedance adjustment circuit. The control circuit is configured to control the drive circuit to turn on or off a switching object including at least one switch device of the switch devices(with an ON or OFF timing of the switching object being) within a switching time that is a period of time in which the impedance adjustment circuit is increasing the impedance of the current path, respectively. The control circuit is configured to make the switching time longer than a time taken by the switching object to respectively switch from off to on or from on to off when the impedance adjustment circuit turns on or off the switching object, and adjust the impedance of the current path to a minimum value of the prescribed range after an end of the switching time.

A vehicle according to an aspect of the present disclosure includes the lighting device, and a vehicle body equipped with the lighting device.

BRIEF DESCRIPTION OF THE DRAWINGS

The figures depict one or more implementations in accordance with the present teaching, by way of example only, not by way of limitation. In the figures, like reference numerals refer to the same or similar elements where.

DETAILED DESCRIPTION

Hereinafter, a lighting device in accordance with each embodiment and a vehicle equipped with a lighting device in accordance with any embodiment will be explained with reference to drawings.

Embodiment 1

Figure 1:
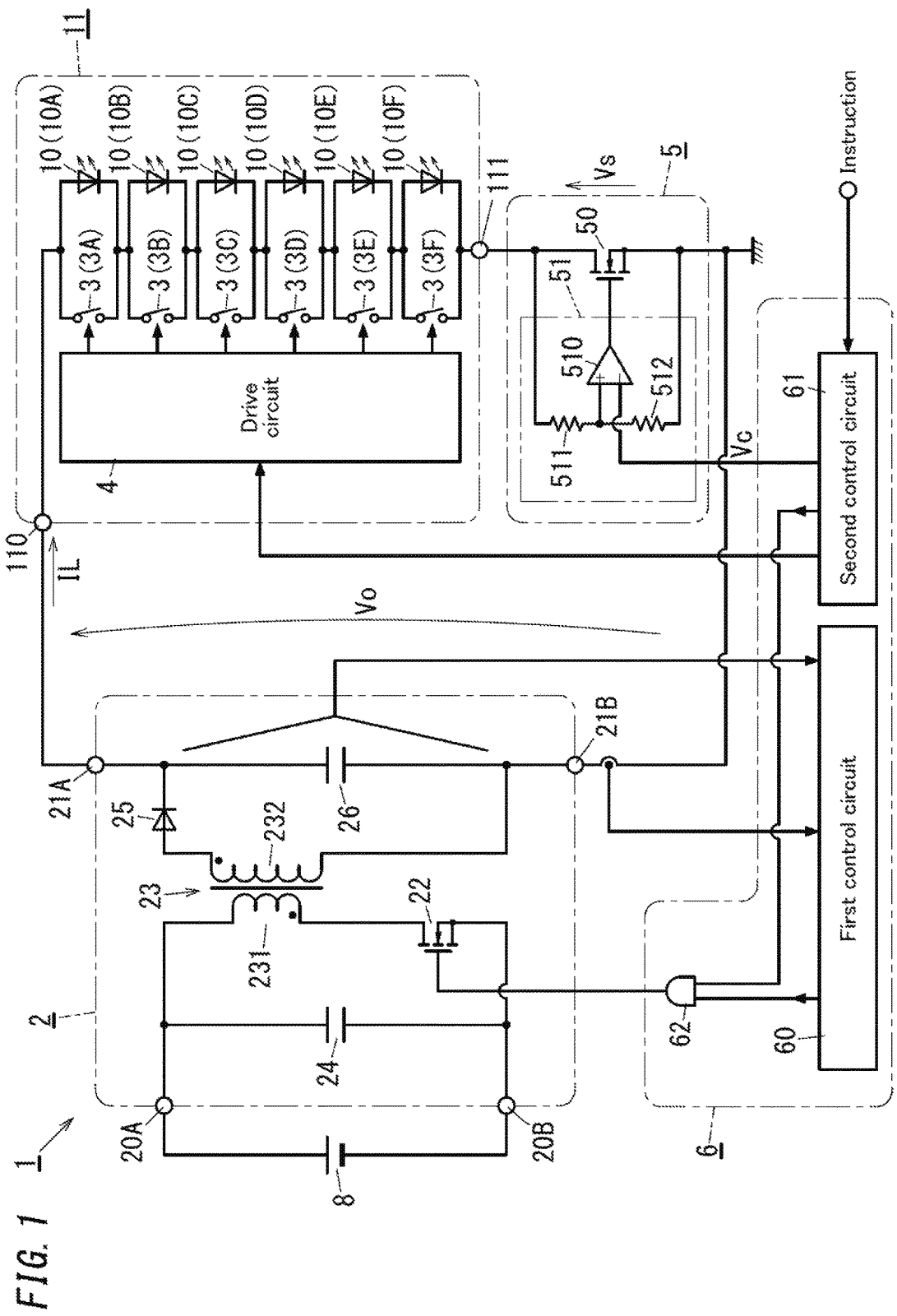
FIG. 1 is a circuit diagram of a lighting device in accordance with Embodiment 1.

As shown in FIG. 1, a lighting device 1 in Embodiment 1 preferably includes a power supply circuit 2, switch devices 3 (in the illustrated example, six switch devices 3A-3F), a drive circuit 4, an impedance adjustment circuit 5 and a control circuit (controller) 6. The lighting device 1 is configured to light respective light sources 10 electrically connected in parallel with the switch devices 3.

Each of the light sources 10 (in the illustrated example, six light sources 10A-10F) is, for example an LED (Light Emitting Diode). Note that each light source 10 is not limited to an LED but may be a halogen lamp, an organic electroluminescence element or the like. The number of the light sources 10 is not limited to six but may be two to five or seven or more. In the following example, the switch devices 3, the drive circuit 4 and the light sources 10 constitute a light source module 11. In the example, respective elements of the switch devices 3 are designated as a first switch device 3A, a second switch device 3B, a third switch device 3C, a fourth switch device 3D, a fifth switch device 3E and a sixth switch device 3F. Similarly, respective elements of the light sources 10 may be designated as a first light source 10A, a second light source 10B, a third light source 10C, a fourth light source 10D, a fifth light source 10E and a sixth light source 10F. The first light source 10A may be electrically connected in parallel with the first switch device 3A. The second light source 10B may be electrically connected in parallel with the second switch device 3B. The third light source 10C may be electrically connected in parallel with the third switch device 3C. The fourth light source 10D may be electrically connected in parallel with the fourth switch device 3D. The fifth light source 10E may be electrically connected in parallel with the fifth switch device 3E. The sixth light source 10F may be electrically connected in parallel with the sixth switch device 3F. Note that each of the switch devices 3 is preferably composed of, for example a semiconductor switching device such as a bipolar transistor or a field effect transistor. In addition, two or more light sources 10 may be electrically connected in parallel with each switch device 3.

Preferably, the light source module 11 has a first terminal 110 and a second terminal 111 and allows a load current IL to flow from the first terminal 110 toward the second terminal 111 therethrough. The first terminal 110 may be electrically connected to a first end (e.g., anode) of the first light source 10A and a first end of the first switch device 3A. A second end (e.g., cathode) of the first light source 10A and a second end of first switch device 3A may be electrically connected to a first end (e.g., anode) of the second light source 10B and a first end of the second switch device 3B. A second end (e.g., cathode) of the second light source 10B and a second end of second switch device 3B may be electrically connected to a first end (e.g., anode) of the third light source 10C and a first end of the third switch device 3C. A second end (e.g., cathode) of the third light source 10C and a second end of third switch device 3C may be electrically connected to a first end (e.g., anode) of the fourth light source 10D and a first end of the fourth switch device 3D. A first end (e.g., cathode) of the fourth light source 10D and a second end of fourth switch device 3D may be electrically connected to a first end (e.g., anode) of the fifth light source 10E and a first end of the fifth switch device 3E. A second end (e.g., cathode) of the fifth light source 10E and a second end of fifth switch device 3E may be electrically connected to a first end (e.g., anode) of the sixth light source 10F and a first end of the sixth switch device 3F. A second end (e.g., cathode) of the sixth light source 10F and a second end of sixth switch device 3F may be electrically connected to the second terminal 111. The drive circuit 4 may be configured to individually turn the six switch devices 3 on and off via respective drive signals. It is however preferable that the drive circuit 4 have a level shift circuit configured to increase (shift) respective reference potential of the drive signals stepwise because the drive signals for driving the six switch devices 3 have respective different reference potentials. Note that the number of the switch devices 3 is not limited to six, but may be any of two to five and seven or more according to the number of the light sources 10.

The load current IL from the first terminal 110 is to flow through part or all of the six light sources 10, in which switch devices 3 electrically connected in parallel therewith are off. That is, part or all of the six light sources 10, in which switch devices 3 electrically connected in parallel therewith are off, are lit. On the other hand, the remaining part or all of the six light sources 10, in which switch devices 3 electrically connected in parallel therewith are on, are unlit. The load current IL does not flow through one or more light sources 10 that are unlit, but flows through the one or more switch devices 3 that are on and electrically connected in parallel with the one or more light sources 10 that are unlit.

Figure 11:
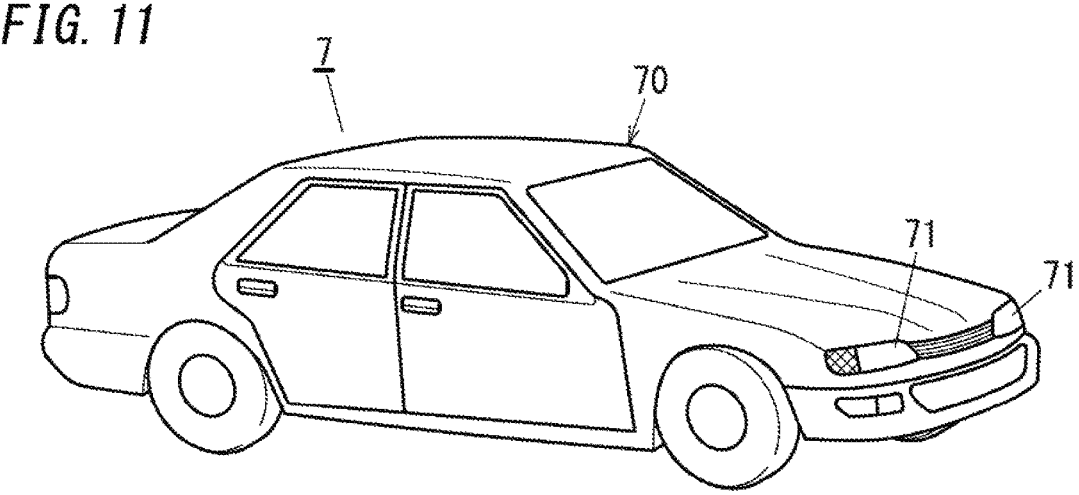
FIG. 11 is a perspective view of a vehicle in accordance with Embodiment 3.

Preferably, the power supply circuit 2 has a first input terminal 20A, a second input terminal 20B, a first output terminal 21A, a second output terminal 21B, a switching device 22, a transformer 23, an input capacitor 24, a diode 25 and an output capacitor 26. The first input terminal 20A may allow a positive electrode of an external power supply 8 to be electrically connected thereto. The second input terminal 20B may allow a negative electrode of the external power supply 8 to be electrically connected thereto. The external power supply 8 is, for example an automotive battery mounted in a vehicle 7 (FIG. 11). That is, a DC voltage of 12 [V] or 24 [V], for example, may be applied between the first and second input terminals 20A and 20B. However, the external power supply 8 is not limited to the automotive battery. In addition, the voltage of the external power supply 8 is not limited to 12 [V] or 24 [V].

Preferably, the first input terminal 20A is electrically connected to a first end of a primary winding 231 in the transformer 23 and a first end of the input capacitor 24. In the example of FIG. 1, the first end of the primary winding 231 is an end, which is on the opposite side to a dot end, of the primary winding 231 (winding termination point). A second end of the primary winding 231, or the primary winding's dot end (winding start point) is electrically connected to a first end (e.g., drain) of the switching device 22. The switching device 22 is, for example an N-channel enhancement MOSFET (Metal Oxide Semiconductor Field Effect Transistor). A second end (e.g., source) of the switching device 22 may be electrically connected to the second input terminal 20B and a second end of the input capacitor 24. Preferably, a first end of a secondary winding 232 in the transformer 23 is electrically connected to an anode of the diode 25. In the example of FIG. 1, the first end of the secondary winding 232 is a secondary winding's dot end (winding start point). A second end of the secondary winding 232 is electrically connected to the second output terminal 21B. The second end of the secondary winding 232 is an end, which is on the opposite side to the dot end, of the secondary winding 232 (winding termination point). A cathode of the diode 25 may be electrically connected to the first output terminal 21A and a first end of the output capacitor 26. A second end of the output capacitor 26 may be electrically connected to the second output terminal 21B. That is, it is preferable that the power supply circuit 2 be composed of a switching power supply circuit such as a flyback converter with (galvanic) isolation, and configured to step up or down the DC voltage from the first and second input terminals 20A and 20B to output a DC output voltage from the first and second output terminals 21A and 21B. The first output terminal 21A may allow a first terminal 110 of the light source module 11 to be electrically connected thereto. The second output terminal 21B may allow a second terminal 111 of the light source module 11 to be electrically connected thereto via the impedance adjustment circuit 5, and also allow ground to be electrically connected thereto. Note that the power supply circuit 2 is not limited to the switching power supply circuit such as the flyback converter with isolation. Examples of the power supply circuit 2 may further include a step-up chopper circuit, a step-up/down chopper circuit, a forward converter and the like.

Preferably, a first control circuit 60 in the control circuit 6 performs switching of the switching device 22 so that the power supply circuit 2 steps up or down an input voltage (DC voltage) from the external power supply 8 to provide the output voltage Vo. The first control circuit 60 may further PWM-control an on-duty ratio of the switching device 22 so that the power supply circuit 2 makes an output current (load current IL) (value thereof) accord with a target value. Alternatively, the first control circuit 60 may control the switching frequency of the switching device 22 so that the power supply circuit 2 makes the output current (load current IL) accord with the target value. Here, the target value of the output current (load current IL) preferably almost equals a rated current of the light sources 10 in the light source module 11.

Figure 2:
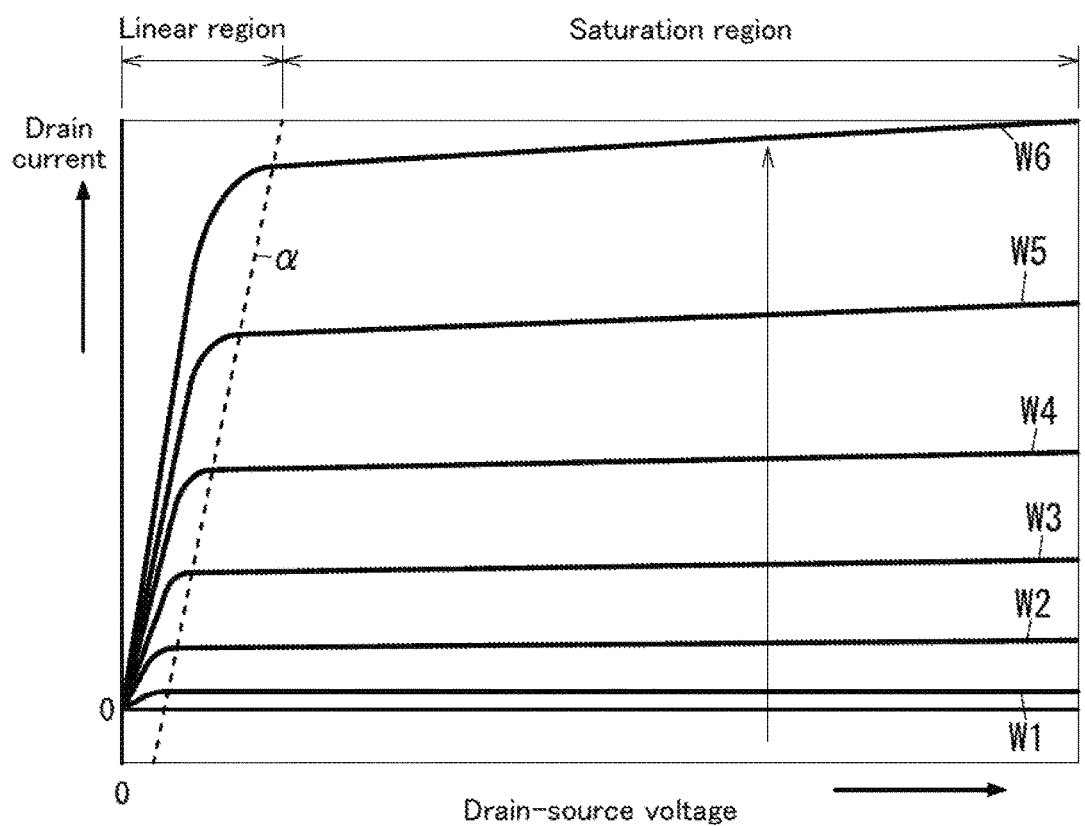
FIG. 2 shows characteristics of a transistor in the lighting device.

Preferably, the impedance adjustment circuit 5 has a transistor 50 as an impedance device, and a transistor driving circuit 51 configured to drive (turn on and off) the transistor 50. The transistor 50 is preferably an N-channel enhancement MOSFET. A first end (e.g., drain) of the transistor 50 may be electrically connected to the second terminal 111 of the light source module 11. A second end (e.g., source) of the transistor 50 may be electrically connected to the second output terminal 21B of the power supply circuit 2 and ground. In short, the transistor 50 as the impedance device may be between both ends of a current path which the load current IL flows through (path from first output terminal 21A to second output terminal 21B of power supply circuit 2). The transistor driving circuit 51 may have an operational amplifier 510 and two resistors 511 and 512. An output terminal of the operational amplifier 510 may be electrically connected to a control end (e.g., gate) of the transistor 50. A first terminal (e.g., non-inverting input terminal (plus terminal)) of the operational amplifier 510 may be electrically connected to the drain of the transistor 50 via the resistor 511. The plus terminal of the operational amplifier 510 may also be electrically connected to the source of the transistor 50 via the resistor 512. In this case, a drain-source voltage of the transistor 50 (hereinafter referred to as an "adjustment voltage Vs") is to be divided by the two resistors 511 and 512 and then applied to the plus terminal of the operational amplifier 510. A second terminal (e.g., inverting input terminal (minus terminal)) of the operational amplifier 510 may be provided with a control signal Vc, which is a DC voltage signal, from a second control circuit 61 in the control circuit 6. The transistor driving circuit 51 may amplify a difference between a signal voltage of the control signal Vc and a voltage proportional to the adjustment voltage Vs to provide a differential signal to the gate of the transistor 50, thereby adjusting the impedance of the transistor 50 so that the adjustment voltage Vs accords with the voltage corresponding to the control signal Vc (value thereof). Here, the transistor driving circuit 51 may be configured to vary the impedance of the transistor 50 (value thereof) in a range between minimum and maximum values. As shown in FIG. 2, a MOSFET (transistor 50) will operate in two active regions of a linear region and a saturation region under the conditions that a gate-source voltage thereof is constant. In the linear region, a drain current of the MOSFET is proportional to a drain-source voltage thereof. In the saturation region, the drain current is almost constant with respect to the drain-source voltage. In FIG. 2, curve lines W1 to W6 represent respective relations between the drain-source voltage and the drain current in different gate-source voltages. Note that the gate-source voltages increase stepwise from the curve line W1 to the curve line W6. In FIG. 2, a dashed line α represents a boundary between the linear region and the saturation region.

The MOSFET has characteristics in which in the linear region the drain-source voltage increases as the gate-source voltage decreases under the conditions that the drain current is constant (see FIG. 2). For example, in case respective drain currents on the curve lines W5 and W6 are a drain current on a sixth dotted line from 0 upward, if the gate-source voltage decreases from the gate-source voltage of the curve line W6 to the gate-source voltage of the curve line W5, the drain-source voltage increases from the drain-source voltage on the curve line W6 to the drain-source voltage on the curve line W5. In the transistor 50 composed of the MOSFET, when the gate-source voltage increases in the linear region, the impedance (resistance) thereof decreases and the drain-source voltage (adjustment voltage Vs) decreases. The transistor 50 will shift from the linear region to the saturation region when the drain-source voltage exceeds the gate-source voltage (in fact voltage obtained by subtracting threshold voltage from gate-source voltage). On the other hand, the transistor 50 will be non-conductive (off-state) to have almost infinite impedance (resistance) when the gate-source voltage falls below the threshold voltage. That is, the impedance of the transistor 50 will vary in the range between the maximum and minimum values (in the range of values in saturation region).

Preferably, the control circuit 6 has the first control circuit 60, the second control circuit 61 and an AND gate 62. The first control circuit 60 may be configured to detect (measure) the load current IL. The first control circuit 60 may perform feedback control of a duty ratio or a switching frequency of the switching device 22 in the power supply circuit 2 so that a detection result of the load current IL (current value thereof) accords with a target value. For example, the first control circuit 60 may output a PWM signal according to a difference between the detection result of the load current IL and the target value. The PWM signal may be provided to a first input terminal of the AND gate 62, and an AND result of both inputs of the AND gate 62 is applied to a control end (e.g., gate) of the switching device 22 from an output terminal of the AND gate 62. The first control circuit 60 may detect (measure) an output voltage Vo of the power supply circuit 2 (voltage across output capacitor 26) and perform feedback control of the power supply circuit 2 so that the output voltage Vo does not exceed an upper limit. Preferably, the upper limit has a value lower than respective withstand voltages of the light source module 11 and the impedance adjustment circuit 5.

Preferably, the second control circuit 61 is configured to perform a first control operation for providing a switch signal to the drive circuit 4 and a second control operation for providing the impedance adjustment circuit 5 with the control signal Vc. The second control circuit 61 may be configured to perform a third control operation for enabling and disabling the power supply circuit 2 (operation thereof). For example, the second control circuit 61 may receive an instruction (e.g., command) from an ECU (electronic control unit) mounted in the vehicle 7 and perform the first, second and third control operations according to the instruction received.

Preferably, when receiving an instruction that allows the light source module 11 to be unlit, the second control circuit 61 performs the third control operation to set an input (voltage level) to a second input terminal of the AND gate 62 to LOW. If the input to the second input terminal of the AND gate 62 is LOW, an output (voltage level) from the AND gate 62 becomes always LOW regardless of the PWM signal from the first control circuit 60 and the switching device 22 is kept off. As a result, the power supply circuit 2 is disabled (turned off) and the light source module 11 is unlit.

Preferably, when receiving an instruction that allows the light source module 11 to be lit, the second control circuit 61 performs the third control operation to set the input to the second input terminal of the AND gate 62 to HIGH. If the input to the second input terminal of the AND gate 62 is HIGH, the PWM signal from the first control circuit 60 is output from the output terminal of the AND gate 62, thereby switching the switching device 22. As a result, the power supply circuit 2 is enabled (turned on) and the light source module 11 is lit.

Preferably, when receiving an instruction that allows a lighting state of the light source module 11 to be switched (hereinafter called a switch instruction), the second control circuit 61 performs the first control operation based on the switch instruction received. The switch instruction preferably includes information that represents part or all of the light sources 10 in the light source module 11, respective states of which are to be switched according thereto, and that represents the states switched. For example, when receiving a switch instruction that allows the first and second light sources 10A and 10B to switch from on to off, the second control circuit 61 provides the drive circuit 4 with a switch signal for switching the first and second switch devices 3A and 3B from off to on. Here, the second control circuit 61 and the drive circuit 4 may be electrically connected via a total of seven electric wires that include a common ground wire (one wire) and signal wires (six wires), a number of which is the same as that (in the illustrated example, six) of the number of switch devices 3 to be driven by the drive circuit 4. The six signal wires may be associated one-to-one with the six switch devices 3. In this case, the second control circuit 61 may apply a high-level voltage between a first signal wire associated with the first switch device 3A and the ground wire and apply a high-level voltage between a second signal wire associated with the second switch device 3B and the ground wire. If the high-level voltage is applied between the first signal wire and the ground wire, the drive circuit 4 may provide the first switch device 3A with a drive signal to turn the first switch device 3A on. Similarly, if the high-level voltage is applied between the second signal wire and the ground wire, the drive circuit 4 may provide the second switch device 3B with a drive signal to turn the second switch device 3B on. The first and second switch devices 3A and 3B are turned on, thereby switching the first and second light sources 10A and 10B from on to off.

Preferably, when performing the second control operation, the second control circuit 61 controls the impedance adjustment circuit 5 by increasing or decreasing a signal voltage of the control signal Vc with the adjustment voltage Vs varied in the range between about zero (lower limit) and an upper limit (higher than upper limit of output voltage Vo from power supply circuit 2). If the second control circuit 61 sets a signal voltage of the control signal Vc (value thereof) to 0 [V] (minimum value), the transistor driving circuit 51 may adjust the impedance of the transistor 50 (value thereof) to the minimum value to set the adjustment voltage Vs to about 0 [V]. If the second control circuit 61 sets a signal voltage of the control signal Vc to a maximum value Vm [V], the transistor driving circuit 51 may adjust the impedance of the transistor 50 to the maximum value to set the adjustment voltage Vs to an upper limit. If the second control circuit 61 varies a signal voltage of the control signal Vc in the range of 0 to Vm [V], the transistor driving circuit 51 may adjust the impedance of the transistor 50 in the range between minimum and maximum values to set the adjustment voltage Vs to a corresponding voltage value between the about 0 and the upper limit.

Here, the second control circuit 61 preferably performs the second control operation when performing the first control operation to switch part or all of the switch devices 3 between on and off. The second control circuit 61 may set a signal voltage of the control signal Vc (value thereof) to the maximum value Vm [V] before providing the drive circuit 4 with a switch signal, and set a signal voltage of the control signal Vc to 0 [V] after providing the drive circuit 4 with the switch signal. That is, the second control circuit 61 may control the impedance adjustment circuit 5 to set the adjustment voltage Vs to the upper limit before providing the drive circuit 4 with the switch signal, and control the impedance adjustment circuit 5 to set the adjustment voltage Vs to the about 0 [V] after providing the drive circuit 4 with the switch signal. In this case, a voltage between the first and second terminals 110 and 111 of the light source module 11 is to decrease significantly because the adjustment voltage Vs is the upper limit immediately after the drive circuit 4 switches part or all of the switch devices 3 from on to off or from off to on. As a result, the load current IL supplied from the power supply circuit 2 to the light source module 11 decreases. The adjustment voltage Vs changes to the about 0 [V] after part or all of the switch devices 3 are switched, and therefore a rated load current IL is supplied from the power supply circuit 2 to the light source module 11. There is however a possibility that the output voltage Vo of the power supply circuit 2 would rise excessively when the load current IL decreases with the adjustment voltage Vs being the upper limit while the power supply circuit 2 is enabled. It is therefore preferable that the second control circuit 61 set the input to the second input terminal of the AND gate 62 to LOW when performing the second control operation to set the adjustment voltage Vs to the upper limit, thereby disabling the power supply circuit 2.

Figure 3:
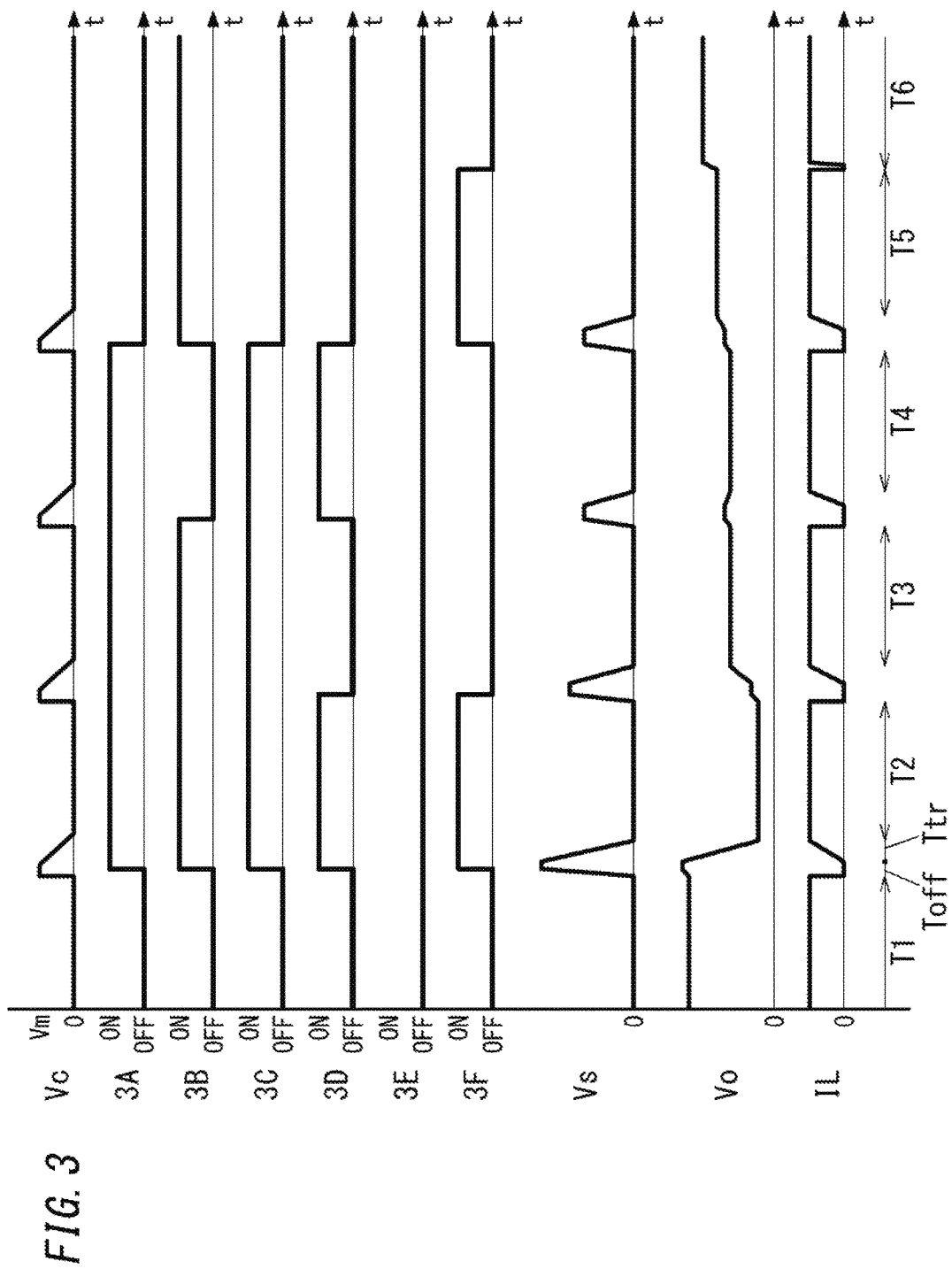
FIG. 3 is a time chart showing an operation of the lighting device.

An operation of the lighting device 1 will be explained in detail with reference to FIG. 3. In FIG. 3, a first time period T1 represents a period of time in which, for example all the light sources 10 are lit, and a second time period T2 represents a period of time in which, for example only the fifth light source 10E is lit while the first to fourth and sixth light sources 10A to 10D and 10F are unlit. A third time period T3 represents a period of time in which, for example fourth to sixth light sources 10D to 10F are lit while the first to third light sources 10A to 10C are unlit. A fourth time period T4 represents a period of time in which, for example the second, fifth and sixth light sources 10B, 10E and 10F are lit while the first, third and fourth light sources 10A, 10C and 10D are unlit. A fifth time period T5 represents a period of time in which, for example the first and third to fifth light sources 10A and 10C to 10E are lit while the second and sixth light sources 10B and 10F are unlit. A sixth time period T6 represents a period of time in which, for example the first and third to sixth light sources 10A and 10C to 10F are lit while the second light source 10B is unlit.

First, during the first time period T1, the drive circuit 4 turns all the light sources 10 on, and therefore all the light sources 10 are lit. The power supply circuit 2 supplies the light source module 11 with the load current IL that accords with the target value. Since all the light sources 10 are lit, the output voltage Vo of the power supply circuit 2 equals a voltage obtained by multiplying the number of the light sources 10 (six) and a voltage drop (forward voltage) of each light source 10 through which the load current IL flows.

The second control circuit 61 subsequently receives a switch instruction that calls for the fifth light source 10E to be lit and the first to fourth and sixth light sources 10A to 10D and 10F to be unlit, and then first performs the second control operation. That is, the second control circuit 61 sets a signal voltage of the control signal Vc (value thereof) to the maximum value Vm [V] and adjusts the impedance of the impedance adjustment circuit 5 (transistor 50) (value thereof) to the maximum value, thereby setting the adjustment voltage Vs to the upper limit (see switching time Toff in FIG. 3). The load current IL supplied from the power supply circuit 2 to the light source module 11 consequently falls to almost zero. The second control circuit 61 performs the first control operation based on the switch instruction in parallel with the second control operation, thereby controlling the drive circuit 4 to turn on the first to fourth and sixth switch devices 3A to 3D and 3F. Here, the switch devices 3 are turned on, thereby reducing internal impedance of the light source module 11. The output capacitor 26 maintains the output voltage Vo of the power supply circuit 2 (value thereof) at a value immediately before the switch devices 3 are turned on. It is however possible to suppress the occurrence of an over-current through the light source module 11 because the impedance of the impedance adjustment circuit 5 is adjusted to the maximum value. Preferably, the second control circuit 61 performs the third control operation in parallel with the second control operation, thereby disabling the power supply circuit 2 before the switch devices 3 are turned on.

Preferably, after performing the first control operation based on the switch instruction, the second control circuit 61 decreases a signal voltage of the control signal Vc (value thereof) from the maximum value Vm to 0 [V] at a constant reduction ratio, thereby gradually decreasing the impedance of the impedance adjustment circuit 5 (value thereof) from the maximum value to the minimum value. A charge stored in the output capacitor 26 is gradually discharged as the impedance of the impedance adjustment circuit 5 is decreased gradually, and therefore the output voltage Vo of the power supply circuit 2 gradually decreases while the load current IL gradually increases (see transition time Ttr in FIG. 3). Preferably, in the transition time Ttr, the second control circuit 61 decreases the signal voltage of the control signal Vc at a reduction ratio that prevents the load current IL through the light source module 11 (value thereof) from exceeding a maximum allowable current of the light sources 10 and the transistors 50 (value thereof). As stated above, the second control circuit 61 outputs the control signal Vc, thereby preventing a sudden increase in the load current IL through the light source module 11. The second control circuit 61 sets the signal voltage of the control signal Vc to 0 [V], thereby completing a transition from the first time period T1 to the second time period T2 (first transition).

A control operation of the second control circuit 61 during a transition from the second time period T2 to the third time period T3 (second transition) is next explained. When receiving a switch instruction that allows the fourth to sixth light sources 10D to 10F to be lit and that allows the first to third light sources 10A to 10C to be unlit, the second control circuit 61 performs the second control operation and also performs the first control operation in parallel therewith, like the transition from the first time period T1 to the second time period T2. Here, during the transition from the second time period T2 to the third time period T3, the second control circuit 61 switches the fourth and sixth switch devices 3D and 3F from on to off without switching the first to third switch devices and fifth 3A to 3C and 3E. In this case, since no switch device 3 is switched from off to on, the output voltage Vo of the power supply circuit 2 increases from the voltage during the second time period T2 (value thereof) to the voltage during the third time period T3 (value thereof). It is accordingly possible to prevent an excessive load current IL from flowing when the second time period T2 is switched to the third time period T3. The second control circuit 61 may therefore perform only the first control operation without performing the second and third control operations.

A control operation of the second control circuit 61 during a transition from the third time period T3 to the fourth time period T4 (third transition) is herein explained. When receiving a switch instruction that allows the second, fifth and sixth light sources 10B, 10E and 10F to be lit and that allows the first, third and fourth light sources 10A, 10C and 10D to be unlit, the second control circuit 61 performs the second control operation and also performs the first control operation in parallel therewith. Here, the number of switch devices 3 that are on (i.e., "3") and the number of switch devices 3 that are off (i.e., "3"), during the third time period T3 as well as the number of switch devices 3 that are on (i.e., "3") and the number of switch devices 3 that are off (i.e., "3"), during the fourth time period T4 are equal to each other. It is therefore considered that ideally, the output voltage Vo of the power supply circuit 2 would not change between the third time period T3 and the fourth time period T4. There is however a possibility that respective output voltages Vo would differ from each other due to temperature characteristics, the dispersion of electric characteristics of the light sources 10 and the like even if both the numbers of the respective switch devices 3 that are on and both the numbers of the respective switch devices 3 that are off are equal to each other. It is accordingly preferable that the second control circuit 61 perform not only the first control operation but also the second control operation (or second and third control operations) in parallel therewith, during the transition from the third time period T3 to the fourth time period T4.

A control operation of the second control circuit 61 during a transition from the fourth time period T4 to the fifth time period T5 (fourth transition) is herein explained. When receiving a switch instruction that allows the first and third to fifth light sources 10A and 10C to 10E to be lit and that allows the second and sixth light sources 10B and 10F to be unlit, the second control circuit 61 performs the second control operation and also performs the first control operation in parallel therewith. Here, the number of switch devices 3 that are on during the fifth time period T5 (i.e., "2") is smaller by one than that of switch devices 3 that are on during the fourth time period T4 (i.e., "3"). The second control circuit 61 can ideally perform only the first control operation because the output voltage Vo of the power supply circuit 2 increases more during the fifth time period T5 than during the fourth time period 4. N-channel enhancement MOSFETs however have a turn-on time and a turn-off time longer than the turn-on time in general. There is accordingly a possibility that an over-current would flow through the light source module 11 because the output current Vo of the power supply circuit 2 increases as a result of, during the switching time Toff, the number of switch devices 3 that are on being greater than that of switch devices 3 that are off. It is therefore preferable that the second control circuit 61 perform the second control operation and also perform the first control operation in parallel therewith even during the transition from the fourth time period T4 to the fifth time period T5.

Last, a control operation of the second control circuit 61 during a transition from the fifth time period T5 to the sixth time period T6 (fifth transition) is explained. When receiving a switch instruction that allows the first and third to sixth light sources 10A and 10C to 10F to be lit and that allows the second light source 10B to be unlit, the second control circuit 61 performs the second control operation and also performs the first control operation in parallel therewith. Here, during the transition from the fifth time period T5 to the sixth time period T6, the second control circuit 61 switches the sixth switch device 3F from on to off without switching the first to fifth switch devices 3A to 3E. In this case, since no switch device 3 is switched from off to on, the output voltage Vo of the power supply circuit 2 (value thereof) increases from the voltage value during the fifth time period T5 to the voltage value during the sixth time period T6. It is therefore possible to prevent an excessive load current IL from flowing when the fifth time period T5 is switched to the sixth time period T6. The second control circuit 61 may therefore perform only the first control operation without performing the second and third control operations.

As stated above, preferably the lighting device 1 controls the drive circuit 4 to turn on or (and/or) off at least one switch device 3 of the switch devices 3 (switching object) while the impedance adjustment circuit 5 is increasing the impedance of the transistor 50. In the example of FIG. 3, the control circuit 6 turns the switch devices 3A to 3D and 3F on during the first transition, and turns the switch devices 3D and 3F off during the second transition. During the third transition, the control circuit 6 turns the switch device 3B and the switch device 3D off and on, respectively. During the fourth transition, the control circuit 6 turns the switch devices 3A, 3C and 3D and the switch devices 3B and 3F off and on, respectively. The control circuit 6 turns the switch device 3F off during the fifth transition. The impedance adjustment circuit 5 also adjusts the impedance of the transistor 50 (value thereof) to the minimum value after the drive circuit 4 switches the at least one switch device 3 from on to off or from off to on. The lighting device 1 can consequently suppress the occurrence of an over-current through the light sources 10 when part or all of the switch devices 3 are switched. Moreover, when part or all of the switch devices 3 are switched, the impedance adjustment circuit 5 adjusts the impedance of the transistor 50 to the maximum value to decrease the voltage applied thereacross. The lighting device 1 can therefore decrease withstand current requisite for each switch device 3 without electrically connecting the switch devices 3 and respective capacitors like the abovementioned associated technology.

Here, it is preferable that the second control circuit 61 individually switch a group of switch devices 3 to be switched from off to on according to the first control operation and a group of switch devices 3 to be switched from on to off according to the first control operation. That is, the second control circuit 61 preferably performs the second control operation in parallel with the first control operation during the switching time Toff with respect to the group of switch devices 3 to be switched from off to on, thereby preventing an over-current from flowing through the light source module 11. On the other hand, the second control circuit 61 preferably performs only the first control operation during the switching time Toff with respect to the group of switch devices 3 to be switched from on to off because an over-current scarcely flows therethrough.

As shown in the time chart of FIG. 3, luminous flux of the light source module 11 decreases during each period of time including the switching time Toff and the transition time Ttr in comparison with n-th time period (n=1, 2, . . . , 6) because the load current IL is small. A possibility that increase and decrease in luminous flux of the light source module 11 would be visible (to naked eye) is increased when a period of time in which input frequency of switch instructions into the control circuit 6 is high and a period of time in which the input frequency is low alternately appear for a comparatively short time.

Therefore, the second control circuit 61 preferably performs the second control operation at regular periods regardless of whether to receive the switch instruction. The second control circuit 61 may perform the second control operation at regular periods so that the impedance adjustment circuit 5 repeats, at regular periods, an operation for increasing the impedance of the transistor 50 (value thereof) to the maximum value and then decreasing it to the minimum value. Accordingly, increase and decrease in luminous flux of the light source module 11 can be less visible even when a period of time in which input frequency of switch instructions into the control circuit 6 is high and a period of time in which the input frequency is low alternately appear for a comparatively short time because the luminous flux of the light source module 11 is increased and decreased at regular periods.

There is a possibility that when part or all of the light sources 10 are switched from on to off, the difference between respective luminous flux of the light source module 11 before and after they are switched would cause visible discomfort (to naked eye) according to the situation. It is therefore preferable that when decreasing the luminous flux of the light source module 11 based on a switch instruction, the second control circuit 61 adjust the impedance of the impedance adjustment circuit 5 so that the load current IL is decreased gradually, thereby gradually decreasing the luminous flux of the light source module 11. For example, a control operation of the second control circuit 61 when the first light source 10A is unlit from a state that only the light source 10A is lit will be explained with reference to the time chart of FIG. 4.

Figure 4:
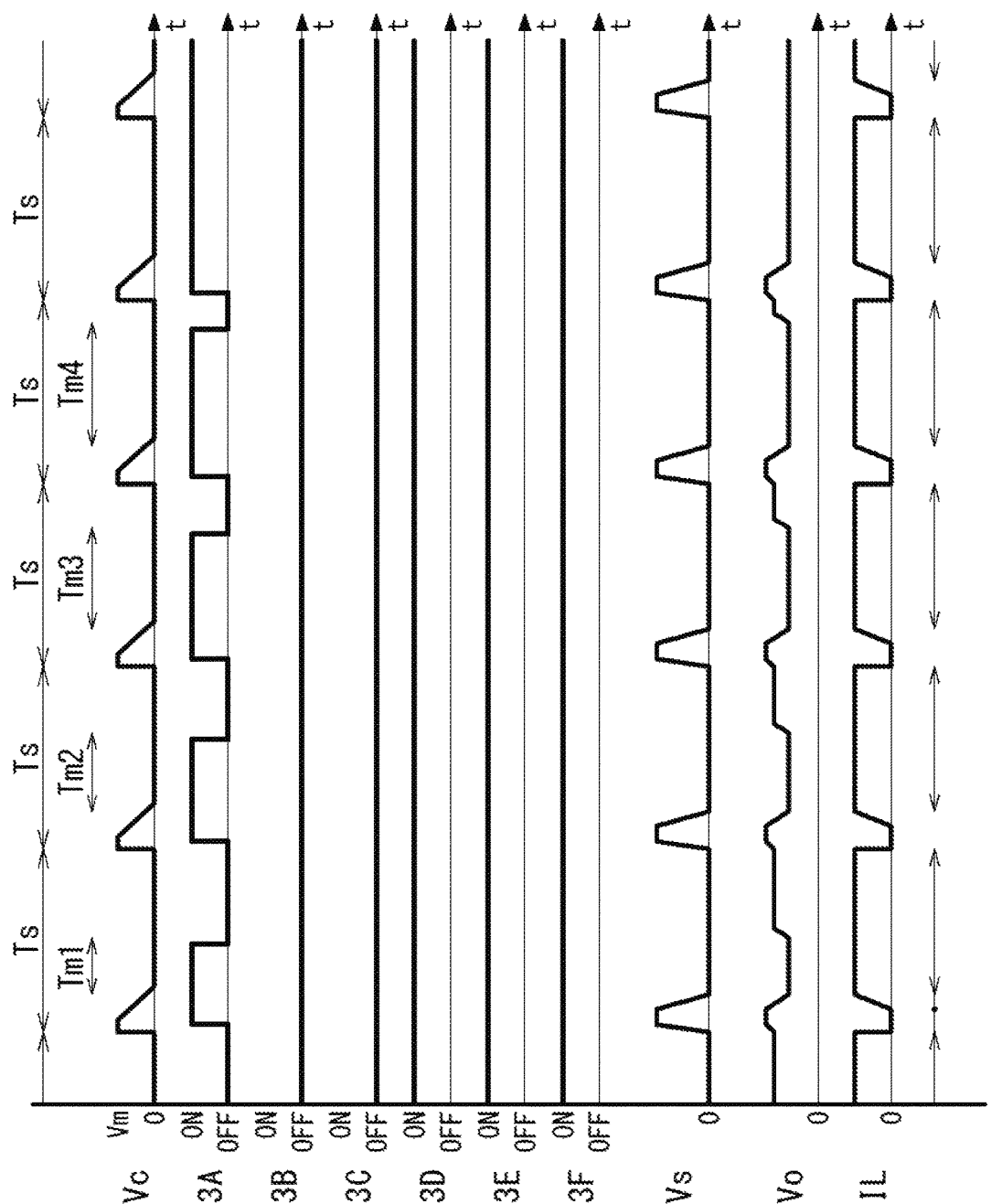
FIG. 4 is a time chart showing another operation of the lighting device.

As shown in FIG. 4, when switching the first switch device 3A from off to on, the second control circuit 61 may perform the second control operation to adjust the impedance of the impedance adjustment circuit 5 to the maximum value, and then turn the first switch device 3A on. The second control circuit 61 may gradually decrease the control signal Vc to 0 [V] with the first switch device 3A kept on, and turn the first switch 3A off after setting the control signal Vc to 0 [V]. In an example, the second control circuit 61 turns off a switching object to be turned off (e.g., first switch 3A) when a time period Tmi (i=1, 2, . . . ) for adjusting an on-time of the switching object elapses from a point in time at which the control signal Vc decreases to the minimum value (e.g., 0 [V]). The time period Tmi may be constant, but preferably variable. In the example of FIG. 4, while repeating the abovementioned operation at regular periods Ts, the second control circuit 61 gradually lengthens the time period Tmi (i=1, 2, ...) and eventually keeps the first switch device 3A always on. That is, the second control circuit 61 may eventually switch the first switch device 3A from off to on after gradually lengthening the on-time of the first switch device 3A, thereby gradually decreasing the luminous flux from the first light source 10A to unlight it. As a result, when part of the light sources 10 are switched from on to off, it is possible to reduce a possibility that the difference between respective luminous flux of the light source module 11 before and after they are switched would cause visible discomfort to the naked eye. Note that when part of the light sources 10 are switched not only from on to off but also from off to on, the second control circuit 61 may perform the abovementioned control operation. The second control circuit 61 may also perform the abovementioned control operation when changing the same state of two or more light sources 10.

Figure 5:
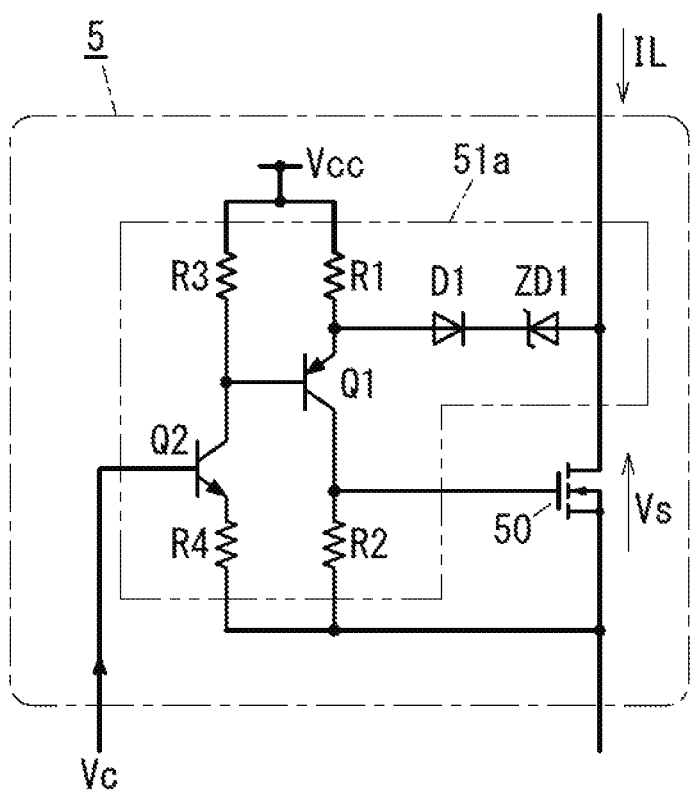
FIG. 5 is a circuit diagram of an impedance adjustment circuit in Modified Example 1 of the lighting device.

FIG. 5 shows a circuit configuration of an impedance adjustment circuit 5 in Modified Example 1 of the lighting device 1 in the embodiment. A transistor driving circuit 51a in Modified Example 1 may include a first transistor Q1, a second transistor Q2, four resistors of first to fourth resistors R1 to R4, a diode D1 and a Zener diode ZD1. The first transistor Q1 may be a PNP bipolar transistor. The second transistor Q2 may be an NPN bipolar transistor. A first end (e.g., emitter) of the first transistor Q1 may be electrically connected to a control power supply via the first resistor R1. The control power supply may be configured to output a DC control power voltage Vcc. A second end (e.g., collector) of the first transistor Q1 may be electrically connected to a source of a transistor 50 via the second resistor R2. The collector of the first transistor Q1 may be electrically connected to a gate of the transistor 50. A first end (e.g., collector) of the second transistor Q2 may be electrically connected to a control end (e.g., base) of the first transistor Q1. The collector of the second transistor Q2 may be electrically connected to the control power supply via the third resistor R3. A second end (e.g., emitter) of the second transistor Q2 may be electrically connected to the source of the transistor 50 via the fourth resistor R4. The second transistor Q2 may allow the control signal Vc to enter a control end (e.g., base) thereof. An anode of the diode D1 may be electrically connected to the emitter of the first transistor Q1. A cathode of the diode D1 may be electrically connected to a cathode of the Zener diode ZD1. An anode of the Zener diode ZD1 may be electrically connected to a drain of the transistor 50. Thus, the first transistor Q1, the first and second resistors R1 and R2 and the diode D1 may constitute a differential amplifier circuit.

Preferably, the second transistor Q2 is configured to be off when no base current flows therethrough with a signal voltage of the control signal Vc (value thereof) being less than a prescribed value, and be on when a base current flows therethrough with the signal voltage of the control signal Vc exceeding the prescribed value. If the second transistor Q2 is off, no current flows through the third resistor R3. Accordingly, a base-emitter voltage of the first transistor Q1 is 0 [V] and the first transistor Q1 is off. If the first transistor Q1 is off, no current flows through the second resistor R2 and therefore no voltage is applied to the gate of the transistor 50. Accordingly, the transistor 50 is off. If the second transistor Q2 is turned on, a current flows through the third resistor R3 and therefore the base-emitter voltage of the first transistor Q1 rises and the first transistor Q1 is turned on. If the first transistor Q1 is turned on, a current flows through the second resistor R2 and therefore a gate voltage of the transistor 50 rises. If the gate voltage exceeds a threshold of the transistor 50, the transistor 50 turns on. The impedance of the transistor 50 decreases as the gate voltage rises, and the adjustment voltage Vs decreases. If the adjustment voltage Vs falls below a total voltage of a Zener voltage of the Zener diode ZD1 and the control power voltage Vcc, an emitter voltage of the first transistor Q1 decreases and a collector current thereof decreases. As a result, the gate voltage of the transistor 50 does not rise unnecessarily and feedback control is provided so that the adjustment voltage Vs does not decrease too much.

Preferably, the transistor driving circuit 51a is configured to increase a gate-source voltage of the transistor 50 by increasing a collector current of the second transistor Q2 and the collector current of the first transistor Q1 as the signal voltage of the control signal Vc increases. For example, a collector voltage of the second transistor Q2 is represented by Vcc−vc×(r3/r4), where vc represents the signal voltage of the control signal Vc, r3 represents resistance of the third resistor R3, and r4 represents resistance of the fourth resistor R4. Thus, the impedance adjustment circuit 5 in Modified Example 1 can adjust a drain-source voltage of the transistor 50 (adjustment voltage Vs) according to the control signal Vc (signal voltage vc). Note that the impedance adjustment circuit 5 in Modified Example 1 may decrease the adjustment voltage Vs by decreasing the impedance of the transistor 50 as the signal voltage vc of the control signal Vc increases. That is, the impedance adjustment circuit 5 in Modified Example 1 may have a relation between increase and decrease in the signal voltage vc of the control signal Vc and increase and decrease in the adjustment voltage Vs, which is opposite to the impedance adjustment circuit 5 in the embodiment shown in FIG. 1. Note that respective resistance of the resistors R1 to R4 of the transistor driving circuit 51a are preferably set so that when the control power voltage Vcc is higher enough than a total of the threshold of the transistor 50 and the Zener voltage and the threshold is lower than the Zener voltage, the collector voltage of the second transistor Q2 and the emitter voltage of the first transistor Q1 are higher than the threshold with the signal voltage equaling the maximum value Vm.

Figure 6:
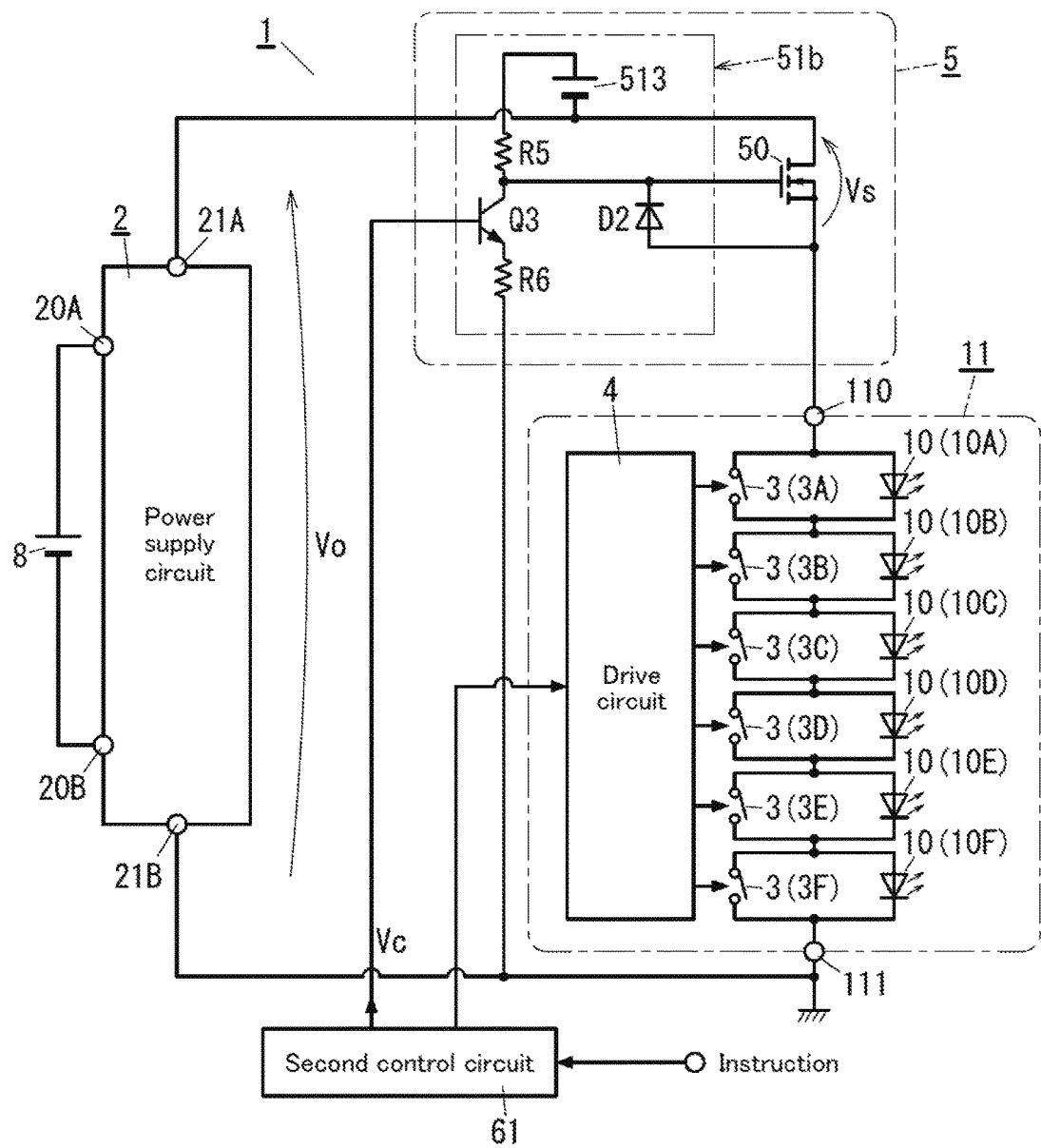
FIG. 6 is a circuit diagram of Modified Example 2 of the lighting device.

FIG. 6 shows a circuit configuration of an impedance adjustment circuit 5 in Modified Example 2 of the lighting device 1 in the embodiment. A transistor 50 in Modified Example 2 may be electrically connected between the first output terminal 21A of the power supply circuit 2 and the first terminal 110 of the light source module 11. A transistor driving circuit 51b in Modified Example 2 may have a third transistor Q3, fifth and sixth resistor R5 and R6, a diode D2 and a control power supply circuit 513. The third transistor Q3 may be an NPN bipolar transistor. The control power supply circuit 513 may be configured to output a DC control power voltage. A negative electrode of the control power supply circuit 513 may be electrically connected to the first output terminal 21A of the power supply circuit 2 and a drain of the transistor 50. A positive electrode of the control power supply circuit 513 may be electrically connected to, through the resistor R5, a first end (e.g., collector) of the third transistor Q3, a gate of the transistor 50 and a cathode of the diode D2. An anode of the diode D2 may be electrically connected to a source of the transistor 50. A second end (e.g., emitter) of the third transistor Q3 may be electrically connected to, through the sixth resistor R6, the second output terminal 21B of the power supply circuit 2 and the second terminal 111 of the light source module 11. The third transistor Q3 may allow the control signal Vc to enter a control end (e.g., base) thereof.

Preferably, the third transistor Q3 is configured to be off when no base current flows therethrough with a signal voltage of the control signal Vc (value thereof) being less than a prescribed value, and be on when a base current flows therethrough with the signal voltage of the control signal Vc exceeding the prescribed value. If the third transistor Q3 is off, a gate voltage of the transistor 50 equals a voltage obtained by adding the control power voltage to the output voltage Vo of the power supply circuit 2. In this case, a source voltage of the transistor 50 equals a voltage obtained by subtracting a threshold of the transistor 50 from the gate voltage. The transistor 50 is therefore in an on-state by operating in a saturated region thereof if the control power voltage is higher enough than the threshold. If the signal voltage of the control signal Vc rises and a base current starts to flow through the third transistor Q3, a collector current of the third transistor Q3 increases and the gate voltage of the transistor 50 decreases. As the gate voltage decreases, the impedance of the transistor 50 increases and the adjustment voltage Vs rises and thereby a voltage applied across the light source module 11 decreases.

Preferably, the transistor driving circuit 51b is configured to decrease the gate voltage of the transistor 50 by increasing the collector current of the third transistor Q3 as the signal voltage of the control signal Vc increases. For example, a collector voltage of the third transistor Q3 (gate voltage of transistor 50) is represented by Vo+Vcc−vc×(r5/r6), where vc represents the signal voltage of the control signal Vc, r5 represents resistance of the fifth resistor R5 and r6 represents resistance of the resistor R6. The connection of the transistor 50 is source follower connection, and therefore the source voltage of the transistor 50 equals a voltage obtained by subtracting the threshold of the transistor 50 from the gate voltage. As a result, a drain-source voltage of the transistor 50 equals a voltage obtained by subtracting the source voltage from the output voltage Vo. That is, the impedance adjustment circuit 5 in Modified Example 2 can adjust the drain-source voltage of the transistor 50 (adjustment voltage Vs) according to the signal voltage vc of the control signal Vc.

The impedance adjustment circuit 5 in the embodiment and Modified Example 1 may be between the first output terminal 21A of the power supply circuit 2 and the first terminal 110 of the light source module 11, like the impedance adjustment circuit 5 in Modified Example 2.

Figure 7:
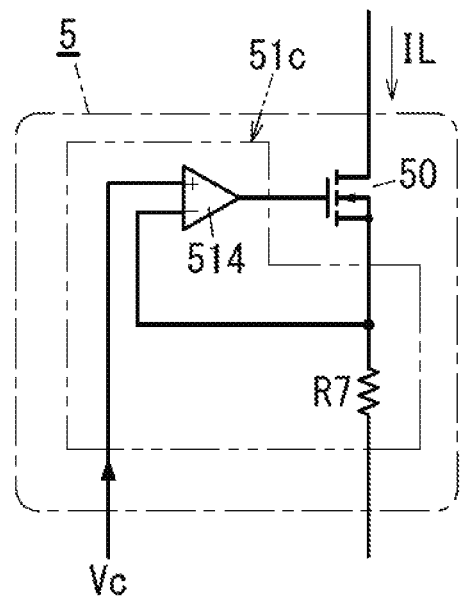
FIG. 7 is a circuit diagram of an impedance adjustment circuit in Modified Example 3 of the lighting device.

FIG. 7 shows a circuit configuration of an impedance adjustment circuit 5 in Modified Example 3 of the lighting device 1 in the embodiment. A transistor driving circuit 51c in Modified Example 3 may have an operational amplifier 514 and a detection resistor R7. The operational amplifier 514 may allow the control signal Vc to enter a first terminal (e.g., non-inverted input terminal (plus terminal)) thereof. A second terminal (e.g., inverted input terminal (minus terminal)) of the operational amplifier 514 may be electrically connected to a source of a transistor 50. A first end of the detection resistor R7 may be electrically connected to the minus terminal of the operational amplifier 514 and the source of the transistor 50. A second terminal of the detection resistor R7 may be electrically connected to the second output terminal 21B of the power supply circuit 2. A drain of the transistor 50 may be electrically connected to the second terminal 111 of the light source module 11. The detection resistor R7 may provide the minus terminal of the operational amplifier 514 with a detection voltage proportional to the load current IL (intensity thereof). The operational amplifier 514 may perform the feedback control of an output voltage thereof so that the detection voltage accords with a signal voltage of the control signal Vc. That is, the transistor driving circuit 51c in Modified Example 3 may increase the output voltage of the operational amplifier 514 (gate voltage of transistor 50) as the signal voltage of the control signal Vc increases. On the other hand, the transistor driving circuit 51c in Modified Example 3 may decrease the output voltage of the operational amplifier 514 (gate voltage of transistor 50) as the signal voltage of the control signal Vc decreases. The impedance adjustment circuit 5 in Modified Example 3 can therefore adjust a drain-source voltage of the transistor 50 (adjustment voltage Vs) according to the signal voltage vc of the control signal Vc.

Figure 8:
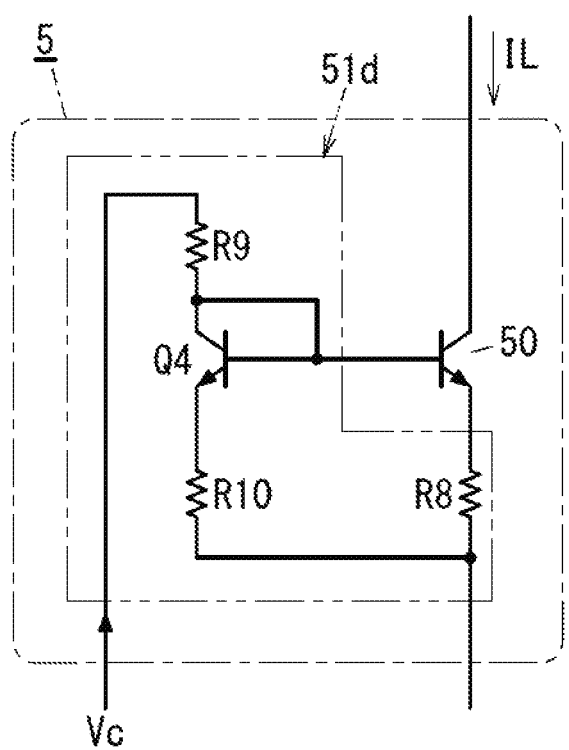
FIG. 8 is a circuit diagram of an impedance adjustment circuit in Modified Example 4 of the lighting device.

FIG. 8 shows a circuit configuration of an impedance adjustment circuit 5 in Modified Example 4 of the lighting device 1 in the embodiment. Preferably, the impedance adjustment circuit 5 in Modified Example 4 includes not a MOSFET but an NPN bipolar transistor (transistor 50) as an impedance device. A transistor driving circuit 51d in Modified Example 4 may have a fourth transistor Q4, and eighth, ninth and tenth resistors R8, R9 and R10. The fourth transistor Q4 may be an NPN bipolar transistor like the transistor 50. Note that preferably the fourth transistor Q4 has almost the same electric characteristics (especially, characteristics of base-emitter voltage and base current) as those of the transistor 50. The fourth transistor Q4 may allow the control signal Vc to enter a first end (e.g., collector) thereof via the ninth resistor R9. A second end (e.g., emitter) of the fourth transistor Q4 may be electrically connected to, through the tenth resistor R10, the second output terminal 21B of the power supply circuit 2 and a first end of the eighth resistor R8. A control end (e.g., base) of the fourth transistor Q4 may be electrically connected to a base of the transistor 50 and the collector of the fourth transistor Q4. A second end of the eighth resistor R8 may be electrically connected to an emitter of the transistor 50. Thus, the transistor 50 and the transistor driving circuit 51d may constitute a current mirror circuit. In this configuration, the load current IL through the transistor 50 (intensity thereof) is decided by a signal current of the control signal Vc from the second control circuit 61. That is, the impedance adjustment circuit 5 in Modified Example 4 can adjust a drain-source voltage of the transistor 50 (adjustment voltage Vs) according to a signal voltage vc of the control signal Vc.

Figure 9:
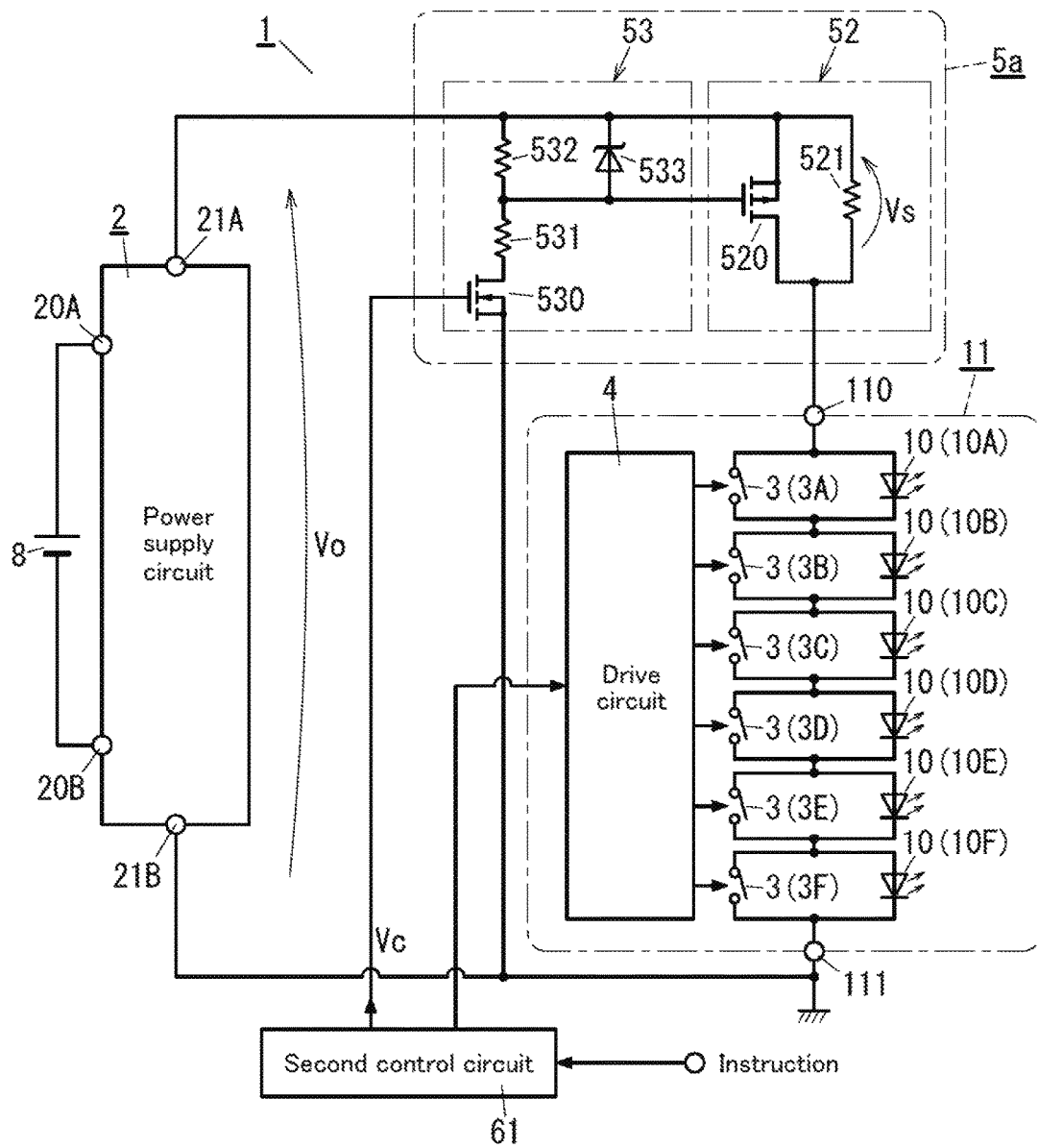
FIG. 9 is a circuit diagram of Modified Example 5 of the lighting device.

FIG. 9 shows a circuit configuration of an impedance adjustment circuit 5a in Modified Example 5 of the lighting device 1 in the embodiment. Preferably, the impedance adjustment circuit 5a in Modified Example 5 includes an impedance device 52 and a switching circuit 53. The impedance device 52 may be composed of a parallel circuit of a first switching device 520 and a resistor 521. The first switching device 520 may be a P-channel enhancement MOSFET. A first end (e.g., source) of the first switching device 520 may be electrically connected to the first output terminal 21A of the power supply circuit 2 and a first end of the resistor 521. A second end (e.g., drain) of the first switching device 520 may be electrically connected to the first terminal 110 of the light source module 11 and a second end of the resistor 521.

Preferably, the switching circuit 53 has a second switching device 530, a first divider resistor 531, a second divider resistor 532 and a Zener diode 533. The second switching device 530 may be an N-channel enhancement MOSFET. A first end (e.g., source) of the second switching device 530 may be electrically connected to the second output terminal 21B of the power supply circuit 2 and the second terminal 111 of the light source module 11. A second end (e.g., drain) of the second switching device 530 may be electrically connected to a first end of the first divider resistor 531. A second end of the first divider resistor 531 may be electrically connected to a first end of the second divider resistor 532, an anode of the Zener diode 533 and a control end (e.g., gate) of the first switching device 520. A second end of the second divider resistor 532 and a cathode of the Zener diode 533 may be electrically connected to the first output terminal 21A of the power supply circuit 2 and the source of the first switching device 520. Note that the second switching device 530 may allow a control signal Vc from the second control circuit 61 to be applied to (enter) a control end (e.g., gate) thereof.

Preferably, the second switching device 530 is off when a signal voltage of the control signal Vc is less than a threshold voltage of the second switching device 530, and is on when the signal voltage of the control signal Vc is greater than or equal to the threshold voltage. No drain current of the second switching device 530 flows through the first and second divider resistors 531 and 532 when the second switching device 530 is off. The first switching device 520 is therefore off because a gate-source voltage of the first switching device 520 is less than the threshold voltage of the first switching device 520. The impedance device 52 may decrease the load current IL by allowing the load current IL to flow through the resistor 521 to increase the adjustment voltage Vs when the first switching device 520 is off. On the other hand, a drain current of the second switching device 530 flows through the first and second divider resistors 531 and 532 when the second switching device 530 is on. The first switching device 520 is therefore turned on because the gate-source voltage of the first switching device 520 becomes greater than or equal to the threshold voltage of the first switching device 520. The impedance device 52 preferably prohibits the load current IL from decreasing by allowing the load current IL to mainly flow through the first switching device 520 to decrease the adjustment voltage Vs when the first switching device 520 is on. Note that it is possible to prevent an over-voltage from being applied to the gate of the first switching device 520 because the gate-source voltage of the first switching device 520 is clamped (fixed) to a Zener voltage of the Zener diode 533.

Preferably, the second control circuit 61 performs the second control operation in parallel with the first control operation, thereby turning the first switching device 520 off to increase the impedance of the impedance device 52 when switching part or all of the switch devices 3. The lighting device 1 can therefore decrease withstand current requisite for each switch device 3 and suppress the occurrence of an over-current through the light source module 11 when part or all of the switch devices 3 are switched. Preferably, the second control circuit 61 sets an off-time of the first switching device 520 during the second control operation to a time in which when part or all of the switch devices 3 are switched from off to on, the output voltage Vo of the power supply circuit 2 decreases to a level by which the load current IL is prevented from exceeding an upper limit thereof even if the first switching device 520 is turned on. Note that the second control circuit 61 may change the off-time of the first switching device 520 according to respective output voltages Vo (values thereof) before and after part or all of the switch devices 3 are switched. Note that preferably resistance of the resistor 521 in the impedance device 52 has a value that is larger enough than on-resistance of the first switching device 520 and that is greater than or equal to resistance (value thereof) obtained by dividing a maximum value of the output voltage Vo of the power supply circuit 2 by the upper limit of the load current IL. The impedance device 52 may include a constant current device (e.g., current regulation diode) in place of the resistor 521, or a constant current circuit (constant current circuit including operational amplifier).

Embodiment 2

Figure 10:
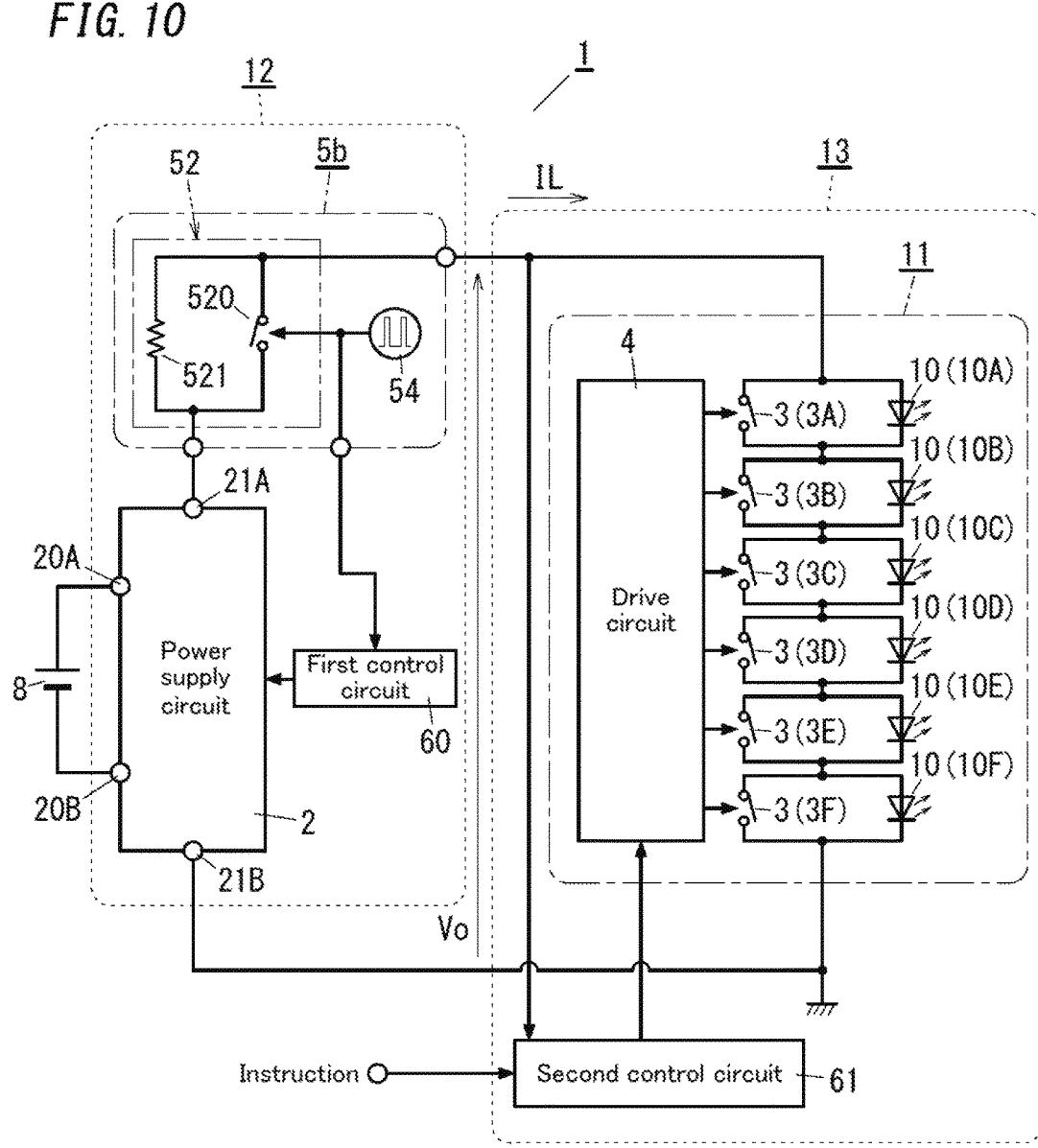
FIG. 10 is a circuit diagram of a lighting device in accordance with Embodiment 2.

As shown in FIG. 10, a lighting device 1 in Embodiment 2 preferably has a power supply unit 12 and a light source unit 13. The power supply unit 12 may have a power supply circuit 2, a first control circuit 60 and an impedance adjustment circuit 5b. The light source unit 13 may have a light source module 11 and a second control circuit 61. Note that the power supply unit 12 may be composed of a printed wiring board and circuit devices mounted thereon, thereby forming the power supply circuit 2, the first control circuit 60 and the impedance adjustment circuit 5b. The light source unit 13 may be composed of another printed wiring board different from the printed wiring board of the power supply unit 12, and light sources 10 and circuit devices mounted thereon, thereby forming the light source module 11 and the second control circuit 61.

Preferably, the impedance adjustment circuit 5b in Embodiment 2 includes an impedance device 52 and a switching circuit 54. The impedance device 52 may be composed of a parallel circuit of a first switching device 520 and a resistor 521. The first switching device 520 is, for example a P-channel enhancement MOSFET.

Preferably, the switching circuit 54 is an oscillator circuit configured to produce rectangular pulses with regular period. The switching circuit 54 may be configured to provide the first switching device 520 (gate thereof) with the rectangular pulses with regular period. In this case, the first switching device 520 is to turn on in synchronization with each falling edge of the rectangular pulses and turn off in synchronization with each rising edge of the rectangular pulses. In short, the impedance adjustment circuit 5b may periodically switch the impedance of a current path (value thereof) through the light source module 11 between maximum and minimum values in synchronization with the period of the rectangular pulses.

Here, the rectangular pulses from the switching circuit 54 may also be provided to the first control circuit 60. The first control circuit 60 may enable the power supply circuit 2 in synchronization with each falling edge of the rectangular pulses and disable the power supply circuit 2 in synchronization with each rising edge of the rectangular pulses.

On the other hand, the second control circuit 61 of the light source unit 13 may detect (measure) an output voltage Vo of the power supply unit 12 to be applied across the light source unit 13. The second control circuit 61 may judge that the impedance adjustment circuit 5b adjusts the impedance of the current path (value thereof) to the maximum value if a detection value of the output voltage Vo is less than a prescribed lower value when no switch devices 3 are switched by the drive circuit 4. The second control circuit 61 may provide the drive circuit 4 with a switch instruction when receiving the switch instruction and judging that the impedance adjustment circuit 5b adjusts the impedance of the current path to the maximum value. That is, the second control circuit 61 may switch part or all of the switch devices 3 when the impedance of the current path is adjusted to the maximum value by the impedance adjustment circuit 5b. The lighting device 1 can therefore decrease withstand current requisite for each switch device 3 and suppress the occurrence of an over-current through the light source module 11 when part or all of the switch devices 3 are switched. Moreover, in the lighting device 1, increase and decrease in luminous flux of the light source module 11 can be less visible because the luminous flux of the light source module 11 increases and decreases at regular periods in synchronization with increase and decrease in the impedance of the current path. Note that preferably, when the impedance of the current path is adjusted to the maximum value, the second control circuit 61 turns on part or all of the switch devices 3 to be switched from off to on. On the other hand, when the impedance of the current path is not adjusted to the maximum value, the second control circuit 61 may turn off part or all of the switch devices 3 to be switched from on to off.

The second control circuit 61 may judge that the impedance adjustment circuit 5b adjusts the impedance of the current path (value thereof) to the maximum value when a decreased amount of the detection value of the output voltage Vo exceeds a prescribed threshold. Alternatively, the second control circuit 61 may detect (measure) a load current IL from the power supply unit 12, and judges whether or not the impedance adjustment circuit 5b adjusts the impedance of the current path to the maximum value based on the load current IL (value thereof). For example, the second control circuit 61 may judge that the impedance adjustment circuit 5b adjusts the impedance of the current path to the maximum value when the load current IL is less than a lower limit or when a decreased amount of the load current IL exceeds a prescribed threshold.

The impedance adjustment circuit 5b may be composed of an impedance device such as a transistor, and a transistor driving circuit configured to drive the transistor, like the impedance adjustment circuit 5 in Embodiment 1.

Here, the second control circuit 61 preferably judges an impedance adjustment state by the impedance adjustment circuit 5b based on the output voltage Vo of the power supply unit 12 or the load current IL. It is therefore unnecessary to provide a line from the power supply unit 12 to the second control circuit 61 of the light source unit 13 in order to transmit a signal representing the impedance adjustment state by the impedance adjustment circuit 5b. It is therefore possible to decrease the number of wires that are electrically connected between the power supply unit 12 and the light source unit 13.

As stated above, in the lighting device 1, it is preferable that the impedance adjustment circuit 5b be configured to repeat, at regular periods, an operation for increasing the impedance of the current path up to a prescribed value (maximum value) and then decreasing the impedance to the minimum value. Preferably, the control circuit 6 (second control circuit 61) is configured to control the drive circuit 4 to turn on or off (a) switch devices 3 at a timing within a period of time in which the impedance adjustment circuit 5b increases the impedance of the current path to the maximum value.

With the abovementioned configuration of the lighting device 1, increase and decrease in luminous flux of the light sources 10 can be less visible because the luminous flux of the light sources 10 is increased and decreased at regular periods.

In the lighting device 1, it is preferable that the second control circuit 61 be configured to judge an adjustment state of the impedance of the current path by the impedance adjustment circuit 5b by detecting a voltage Vo or a current IL from the power supply circuit 2. Preferably, the second control circuit 61 is configured to turn on or off (a) switch devices 3 at a timing when it is judged that the impedance is increased.

With the abovementioned configuration of the lighting device 1, it is unnecessary to provide a line from the power supply circuit 2 to the second control circuit 61 in order to transmit a signal representing the impedance adjustment state by the impedance adjustment circuit 5b. The lighting device 1 can therefore decrease the number of electric wires.

Embodiment 3

A vehicle 7 according to the present embodiment is, for example a passenger car such as a sedan (see FIG. 11). Preferably, a vehicle body 70 of the vehicle 7 is equipped with lighting devices 1 according to Embodiment 1 or 2 as, for example headlamps 71. If part or all of switch devices 3 on each side are switched between on and off, the vehicle 7 equipped with the lighting devices 1 can vary a headlight range (distribution of beam) of a corresponding headlamp 71.

As stated above, a lighting device 1 according to a first aspect includes a power supply circuit 2, switch devices 3, a drive circuit 4, an impedance adjustment circuit 5, 5a and a control circuit 6. The power supply circuit 2 has a first output terminal 21A and a second output terminal 21B and is configured to output a load current IL as a DC current from the first output terminal 21A to the second output terminal 21B. The switch devices 3 are electrically connected in series between the first and second output terminals 21A and 21B. Each of the switch devices 3 is electrically connected in parallel with one or more light sources 10 to be lit by the load current IL flowing therethrough. The drive circuit 4 is configured to individually turn on and off the switch devices 3. The impedance adjustment circuit 5, 5a has an impedance device 50, 52 (hereinafter transistor 50 for the sake of simplicity) between the first and second output terminals 21A and 21B and an impedance device driving circuit 51, 51a, 51b, 51c, 51d, 53 (hereinafter transistor driving circuit 51 for the sake of simplicity) configured to vary an impedance of the transistor 50 in a range between minimum and maximum values. The impedance adjustment circuit 5, 5a is configured to vary the impedance of the transistor 50, thereby adjusting an impedance of a current path from the first output terminal 21A to the second output terminal 21B. The control circuit 6 (second control circuit 61) is configured to control the drive circuit 4 and the impedance adjustment circuit 5, 5a. The control circuit 6 (second control circuit 61) is configured to control the drive circuit 4 to turn on or off a switching object including at least one switch device of the switch devices 3 with an ON or OFF timing of the switching object being within a switching time Toff that is a period of time in which the impedance adjustment circuit 5, 5a is increasing the impedance of the current path, respectively. The control circuit 6 is configured to make the switching time Toff longer than a time taken by the switching object to respectively switch from off to on or from on to off when the control circuit 6 turns on or off the switching object. The control circuit 6 is further configured to adjust the impedance of the current path (value thereof) to the minimum value after an end of the switching time (Toff).

In the lighting device 1 according to the first aspect, when the switching object is switched, the impedance of the current path IL is increased. It is therefore possible to decrease withstand current requisite for each switch device 3 and suppress the occurrence of an over-current through (a) light sources 10.

In a lighting device 1 according to a second aspect realized in combination with the first aspect, the control circuit 6 (second control circuit 61) is preferably configured to control the impedance adjustment circuit 5, 5*a* to increase the impedance of the current path before controlling the drive circuit 4 to turn on or off the switching object. The control circuit 6 (second control circuit 61) is preferably configured to control the impedance adjustment circuit 5, 5*a* to adjust the impedance of the current path to the minimum value after the drive circuit 4 switches the switching object from off to on or from on to off.

The lighting device 1 according to the second aspect can reduce power consumption by the impedance device when the switching object is not switched because the impedance of the current path is adjusted to the minimum value except when the switching object is switched.

In a lighting device 1 according to a third aspect realized in combination with a first or second aspect, the control circuit 6 is preferably configured to adjust the impedance of the current path to the minimum value while gradually decreasing the impedance after the drive circuit 4 switches the switching object from off to on or from on to off.

The lighting device 1 according to the third aspect gradually increases the load current IL by gradually decreasing the impedance of the current path, and can therefore surely suppress the occurrence of an over-current through (a) light sources 10.

In a lighting device 1 according to a fourth aspect realized in combination with any one of the first to third aspects, the impedance adjustment circuit 5 preferably includes a voltage detection circuit (resistors 511 and 512) configured to detect a voltage across the transistor 50. The transistor driving circuit 51 is preferably configured to vary the impedance of the transistor 50 so that a detection value by the voltage detection circuit (a voltage obtained by dividing a drain-source voltage of the transistor 50 by the resistors 511 and 512) accords with a target value provided by the control circuit 6.

The lighting device 1 according to the fourth aspect can easily adjust the impedance of the transistor 50 by making a voltage across the transistor 50 accord with the target value.

In a lighting device 1 according to a fifth aspect realized in combination with any one of the first to third aspects, the impedance adjustment circuit 5 preferably includes a current detection circuit (detection resistor R7) configured to detect a current (load current IL) flowing through the transistor 50. The transistor driving circuit 51*c* is preferably configured to vary the impedance of the transistor 50 so that a detection value by the current detection circuit (detection resistor R7) accords with a target value provided by the control circuit 6.

The lighting device 1 according to the fifth aspect can easily adjust the impedance of the transistor 50 by making the load current IL flowing through the transistor 50 accord with the target value.

In a lighting device 1 according to a sixth aspect realized in combination with any one of the first to aspects third, the impedance device 52 preferably includes a parallel circuit of a switch (first switching device 520) and a circuit element (resistor 521) having an impedance larger than an on-resistance of the first switching device 520. The impedance device driving circuit (switching circuit 53) is preferably configured to turn off the first switching device 520 to increase the impedance of the current path, and turn on the first switching device 520 to decrease the impedance of the current path.

The lighting device 1 according to the sixth aspect can easily adjust the impedance of the impedance device 52 by switching a path through which the load current IL flows between the first switching device 520 and the resistor 521.

In a lighting device 1 according to a seventh aspect realized in combination with the sixth aspect, the impedance of the resistor 521 (resistance value) preferably has a value larger than that obtained by dividing a maximum value of an output voltage Vo from the power supply circuit 2 by a maximum value of the load current IL.

The lighting device 1 according to the seventh aspect can prevent an over-voltage from being applied to the first switching device 520.

In a lighting device 1 according to an eighth aspect realized in combination with a sixth or seventh aspect, the circuit element is preferably a constant current device or a constant current circuit. The control circuit 6 (second control circuit 61) is preferably configured to control the impedance adjustment circuit 5*a* to turn off the first switching device 520 before controlling the drive circuit 4 to turn on or off the switching object. The second control circuit 61 is preferably configured to control the impedance adjustment circuit 5*a* to turn on the first switching device 520 after the drive circuit 4 switches the switching object from off to on or from on to off.

The lighting device 1 according to the eighth aspect can easily adjust the impedance of the impedance device 52 by switching a path through which the load current IL flows between the first switching device 520 and the constant current device or the constant current circuit.

In a lighting device 1 according to a ninth aspect realized in combination with any one of the first to eighth aspect, the impedance adjustment circuit 5, 5*a* is preferably configured to repeat, at regular periods, an operation for increasing the impedance of the current path to a prescribed value and then decreasing the impedance to the minimum value.

The lighting device 1 according to the ninth aspect can be less visible to variations in luminous flux of (a) light sources 10 even when a period of time in which switching frequency of the switching object is high and a period of time in which the switching frequency is low alternately appear because the luminous flux of (a) light sources 10 is increased and decreased at regular periods.

In a lighting device 1 according to a tenth aspect realized in combination with any one of the first to ninth aspect, the second control circuit 61 is preferably configured to turn on the switching object with the ON timing thereof being within the switching time Toff. The second control circuit 61 is preferably configured to turn off the switching object at an arbitrary timing within a time period that includes both of a period of time in which the impedance adjustment circuit 5, 5*a* is adjusting the impedance of the current path and a period of time in which the impedance adjustment circuit 5 is not adjusting the impedance.

The lighting device 1 according to the tenth aspect can simplify the control operation by the second control circuit 61 because the impedance adjustment circuit 5 need not adjust the impedance of the current path when the switching object is switched from on to off.

A lighting device 1 according to an eleventh aspect includes a power supply circuit 2, switch devices 3, a drive circuit 4, an impedance adjustment circuit 5*b* and a control circuit 6. The power supply circuit 2 has a first output terminal 21A and a second output terminal 21B and that is configured to output a load current as a DC current from the first output terminal 21A to the second output terminal 21B. The switch devices 3 are electrically connected in series between the first and second output terminals 21A, 21B. Each of the switch devices 3 is electrically connected in parallel with a corresponding one or more light sources 10 to be lit by the load current flowing therethrough. The drive circuit 4 is configured to individually turn on and off the switch devices 3. The impedance adjustment circuit 5b has an impedance device 52 between the first and second output terminals 21A, 21B and an impedance device driving circuit 54 configured to vary an impedance of the impedance device 52 in a range between minimum and maximum values. The impedance adjustment circuit 5b is configured to vary the impedance of the impedance device 52, thereby adjusting an impedance of a current path from the first output terminal 21A to the second output terminal 21B. The control circuit 6 is configured to control the drive circuit 4. The control circuit 6 is configured to control the drive circuit 4 to turn on or off a switching object including at least one switch device of the switch devices 3 within a switching time Toff that is a period of time in which the impedance adjustment circuit 5b is increasing the impedance of the current path, respectively. The impedance adjustment circuit 5b is configured to make the switching time Toff longer than a time taken by the switching object to respectively switch from off to on or from on to off when the control circuit 6 turns on or off the switching object. The impedance adjustment circuit 5b is configured to adjust the impedance of the current path to the minimum value after an end of the switching time Toff.

The lighting device 1 according to the eleventh aspect can decrease withstand current requisite for each switch device 3 and suppress the occurrence of an over-current through (a) light sources 10.

In a lighting device 1 according to a twelfth aspect realized in combination with the eleventh aspect, the impedance adjustment circuit 5b is preferably configured to repeat, at regular periods, an operation for increasing the impedance of the current path up to a prescribed value (maximum value) and then decreasing the impedance to the minimum value. The control circuit 6 (second control circuit 61) is preferably configured to control the drive circuit 4 to turn on or off the switching object at a timing within a period of time in which the impedance adjustment circuit 5b increases the impedance of the current path to the maximum value.

With the lighting device 1 according to the twelfth aspect, increase and decrease in luminous flux of light sources 10 can be less visible because the luminous flux of the light sources 10 increases and decreases at regular periods.

In a lighting device 1 according to a thirteenth aspect realized in combination with the twelfth aspect, the second control circuit 61 is preferably configured to judge an adjustment state of the impedance of the current path by the impedance adjustment circuit 5b by detecting a voltage Vo or a current IL from the power supply circuit 2. The second control circuit 61 is preferably configured to turn on or off the switching object at a timing when it is judged that the impedance is increased.

With the lighting device 1 according to the thirteenth aspect it is unnecessary to provide a line from the power supply circuit 2 to the second control circuit 61 in order to transmit a signal representing the impedance adjustment state by the impedance adjustment circuit 5b. The lighting device 1 according to the thirteenth aspect can therefore decrease the number of electrical wires.

As stated above, the vehicle 7 according to the embodiment may have the lighting devices 1 and the vehicle body 70 equipped with the lighting devices 1.

The vehicle 7 is equipped with the lighting devices 1 each of which can decrease withstand current requisite for each switch device 3 and suppress the occurrence of an over-current through the light source module 11. It is therefore possible to avoid each light source module 11 being unlit due to an over-current and improve safety.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device, comprising:
a power supply circuit that has a first output terminal and a second output terminal and that is configured to output a load current as a DC current from the first output terminal to the second output terminal;
switch devices that are electrically connected in series between the first and second output terminals, each of the switch devices being electrically connected in parallel with one or more light sources to be lit by the load current flowing therethrough;
a drive circuit that is configured to individually turn on and off the switch devices;
an impedance adjustment circuit that has an impedance device between the first and second output terminals and an impedance device driving circuit configured to vary an impedance of the impedance device in a prescribed range, the impedance adjustment circuit being configured to vary the impedance of the impedance device, thereby adjusting an impedance of a current path from the first output terminal to the second output terminal; and
a control circuit that is configured to control the drive circuit and the impedance adjustment circuit, the control circuit being configured to control the drive circuit to turn on or off a switching object including at least one switch device of the switch devices within a switching time that is a period of time in which the impedance adjustment circuit is increasing the impedance of the current path, respectively, wherein
the control circuit is configured to
make the switching time longer than a time taken by the switching object to respectively switch from off to on or from on to off when the impedance adjustment circuit turns on or off the switching object, and
adjust the impedance of the current path to a minimum value of the prescribed range after an end of the switching time.

2. The lighting device of claim 1, wherein the control circuit is configured to control the impedance adjustment circuit to increase the impedance of the current path before controlling the drive circuit to turn on or off the switching object, and control the impedance adjustment circuit to adjust the impedance of the current path to the minimum value after the drive circuit switches the switching object from off to on or from on to off.

3. The lighting device of claim 2, wherein
the impedance adjustment circuit comprises a current detection circuit configured to detect a current flowing through the impedance device, and
the impedance device driving circuit is configured to vary the impedance of the impedance device so that a detection value by the current detection circuit accords with a target value provided by the control circuit.

4. The lighting device of claim 2, wherein the control circuit is configured to adjust the impedance of the current path to the minimum value while decreasing the impedance after the drive circuit switches the switching object from off to on or from on to off.

5. The lighting device of claim 2, wherein
the impedance adjustment circuit comprises a voltage detection circuit configured to detect a voltage across the impedance device, and
the impedance device driving circuit is configured to vary the impedance of the impedance device so that a detection value by the voltage detection circuit accords with a target value provided by the control circuit.

6. The lighting device of claim 1, wherein the control circuit is configured to adjust the impedance of the current path to the minimum value while decreasing the impedance after the drive circuit switches the switching object from off to on or from on to off.

7. The lighting device of claim 6, wherein
the impedance adjustment circuit comprises a voltage detection circuit configured to detect a voltage across the impedance device, and
the impedance device driving circuit is configured to vary the impedance of the impedance device so that a detection value by the voltage detection circuit accords with a target value provided by the control circuit.

8. The lighting device of claim 6, wherein
the impedance adjustment circuit comprises a current detection circuit configured to detect a current flowing through the impedance device, and
the impedance device driving circuit is configured to vary the impedance of the impedance device so that a detection value by the current detection circuit accords with a target value provided by the control circuit.

9. The lighting device of claim 1, wherein
the impedance adjustment circuit comprises a voltage detection circuit configured to detect a voltage across the impedance device, and
the impedance device driving circuit is configured to vary the impedance of the impedance device so that a detection value by the voltage detection circuit accords with a target value provided by the control circuit.

10. The lighting device of claim 1, wherein
the impedance adjustment circuit comprises a current detection circuit configured to detect a current flowing through the impedance device, and
the impedance device driving circuit is configured to vary the impedance of the impedance device so that a detection value by the current detection circuit accords with a target value provided by the control circuit.

11. The lighting device of claim 1, wherein
the impedance device comprises a parallel circuit of a switch and a circuit element having an impedance larger than an on-resistance of the switch, and
the impedance device driving circuit is configured to
turn off the switch to increase the impedance of the current path, and
turn on the switch to decrease the impedance of the current path.

12. The lighting device of claim 11, wherein the impedance of the circuit element has a value larger than that obtained by dividing a maximum value of an output voltage from the power supply circuit by a maximum value of the load current.

13. The lighting device of claim 12, wherein
the circuit element is a constant current device or a constant current circuit, and
the control circuit is configured to control the impedance adjustment circuit to turn off the switch before controlling the drive circuit to turn on and off the switching object, and control the impedance adjustment circuit to turn on the switch after the drive circuit switches the switching object from off to on or from on to off.

14. The lighting device of claim 11, wherein
the circuit element is a constant current device or a constant current circuit, and
the control circuit is configured to control the impedance adjustment circuit to turn off the switch before controlling the drive circuit to turn on and off the switching object, and control the impedance adjustment circuit to turn on the switch after the drive circuit switches the switching object from off to on or from on to off.

15. The lighting device of claim 1, wherein the impedance adjustment circuit is configured to repeat, at regular periods, an operation for increasing the impedance of the current path to a prescribed value and then decreasing the impedance to the minimum value.

16. The lighting device of claim 1, wherein
the control circuit is configured to
turn on the switching object within the switching time, and
turn off the switching object at an arbitrary timing within a time period that includes both of a period of time in which the impedance adjustment circuit is adjusting the impedance of the current path and a period of time in which the impedance adjustment circuit is not adjusting the impedance.

17. A vehicle, comprising
a lighting device of claim 1, and
a vehicle body equipped with the lighting device.

18. A lighting device, comprising:
a power supply circuit that has a first output terminal and a second output terminal and that is configured to output a load current as a DC current from the first output terminal to the second output terminal;
switch devices that are electrically connected in series between the first and second output terminals, each of the switch devices being electrically connected in parallel with a corresponding one or more light sources to be lit by the load current flowing therethrough;
a drive circuit that is configured to individually turn on and off the switch devices;
an impedance adjustment circuit that has an impedance device between the first and second output terminals and an impedance device driving circuit configured to vary an impedance of the impedance device in a range between minimum and maximum values, the impedance adjustment circuit being configured to vary the impedance of the impedance device, thereby adjusting an impedance of a current path from the first output terminal to the second output terminal; and
a control circuit that is configured to control the drive circuit, the control circuit being configured to control the drive circuit to turn on or off a switching object including at least one switch device of the switch devices within a switching time that is a period of time in which the impedance adjustment circuit is increasing the impedance of the current path, respectively, wherein
the impedance adjustment circuit is configured to
make the switching time longer than a time taken by the switching object to respectively switch from off to on or from on to off when the control circuit turns on or off the switching object, and
adjust the impedance of the current path to the minimum value after an end of the switching time.

19. The lighting device of claim 18, wherein
the impedance adjustment circuit is configured to repeat, at regular periods, an operation for increasing the impedance of the current path up to a prescribed value and then decreasing the impedance to the minimum value, and the control circuit is configured to control the drive circuit to turn on or off the switching object at a timing within a period of time in which the impedance adjustment circuit increases the impedance of the current path to the prescribed value.

20. The lighting device of claim 19, wherein the control circuit is configured to
judge an adjustment state of the impedance of the current path by the impedance adjustment circuit by detecting a voltage or a current from the power supply circuit, and turn on or off the switching object at a timing when it is judged that the impedance is increased.

* * * * *